United States Patent
Ashour et al.

(10) Patent No.: US 12,400,666 B2
(45) Date of Patent: Aug. 26, 2025

(54) METHOD AND APPARATUS FOR LOW COST ERROR RECOVERY IN PREDICTIVE CODING

(71) Applicant: Telefonaktiebolaget LM Ericsson (publ), Stockholm (SE)

(72) Inventors: Chamran Moradi Ashour, Stockholm (SE); Erik Norvell, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 302 days.

(21) Appl. No.: 17/599,070

(22) PCT Filed: Mar. 27, 2020

(86) PCT No.: PCT/EP2020/058638
§ 371 (c)(1),
(2) Date: Sep. 28, 2021

(87) PCT Pub. No.: WO2020/201039
PCT Pub. Date: Oct. 8, 2020

(65) Prior Publication Data
US 2022/0199098 A1 Jun. 23, 2022

Related U.S. Application Data

(60) Provisional application No. 62/892,637, filed on Aug. 28, 2019, provisional application No. 62/826,084, filed on Mar. 29, 2019.

(51) Int. Cl.
*G10L 19/005* (2013.01)
*G06F 17/14* (2006.01)
(Continued)

(52) U.S. Cl.
CPC .......... *G10L 19/005* (2013.01); *G06F 17/141* (2013.01); *G10L 19/008* (2013.01); *G10L 19/04* (2013.01)

(58) Field of Classification Search
CPC ...... G10L 19/005; G10L 19/008; G10L 19/04
See application file for complete search history.

(56) References Cited

U.S. PATENT DOCUMENTS 7,835,916 B2 * 11/2010 Bruhn .................. G10L 19/005
704/200
8,359,196 B2 1/2013 Yoshida
(Continued)

FOREIGN PATENT DOCUMENTS

CN 104021792 A 9/2014
CN 107112022 A 8/2017
(Continued)

OTHER PUBLICATIONS

Japanese Office Action, Japanese Patent Application No. 2021-557779, mailed Jan. 17, 2023, 6 pages.
(Continued)

*Primary Examiner* — Bhavesh M Mehta
*Assistant Examiner* — Nandini Subramani
(74) *Attorney, Agent, or Firm* — Sage Patent Group

(57) ABSTRACT

Methods, apparatuses, decoders, and computer programs for replacing decoded parameters in a received multichannel signal are provided. Multichannel parameters of a frame of the signal are decoded. Responsive to a bad frame being indicated, it is determined that a parameter memory is corrupted. Responsive to a bad frame not being indicated: responsive to the parameter memory not being corrupted, a location measure is derived of a reconstructed sound source based on decoded multichannel parameters. Responsive to the parameter memory being corrupted, it is determined,
(Continued)

based on the location measure, whether the reconstructed sound source is stable and predominantly concentrated in a subset of channels of multichannels of the received multichannel signal. Responsive to the reconstructed sound source being concentrated in the subset of channels of the multichannels and being stable, parameter recovery is activated to replace decoded multichannel parameters with stored multichannel parameters.

14 Claims, 8 Drawing Sheets

(51) Int. Cl.
  *G10L 19/008* (2013.01)
  *G10L 19/04* (2013.01)

(56) References Cited

U.S. PATENT DOCUMENTS

| | | | |
|---|---|---|---|
| 9,390,729 B2 | 7/2016 | Wang | |
| 2004/0039464 A1* | 2/2004 | Virolainen | G10L 19/005 |
| 2005/0154584 A1 | 7/2005 | Jelinek et al. | |
| 2007/0100614 A1 | 5/2007 | Yoshida et al. | |
| 2010/0198590 A1 | 8/2010 | Tackin et al. | |
| 2010/0280822 A1 | 11/2010 | Yoshida | |
| 2011/0125505 A1 | 5/2011 | Vaillancourt et al. | |
| 2013/0339038 A1 | 12/2013 | Norvell et al. | |
| 2014/0207445 A1* | 7/2014 | Gao | G10L 19/005 704/220 |
| 2016/0104487 A1 | 4/2016 | Schnabel et al. | |
| 2016/0111100 A1 | 4/2016 | Ramo et al. | |
| 2016/0148618 A1* | 5/2016 | Huang | G10L 19/0212 381/2 |
| 2016/0337776 A1 | 11/2016 | Breebaart et al. | |
| 2017/0169833 A1* | 6/2017 | Lecomte | G10L 19/20 |
| 2017/0180905 A1 | 6/2017 | Purnhagen et al. | |
| 2019/0005967 A1* | 1/2019 | Lecomte | G10L 19/125 |

FOREIGN PATENT DOCUMENTS

| | | |
|---|---|---|
| CN | 108810281 A | 11/2018 |
| CO | 10164064 A2 | 11/2011 |
| JP | 2003140699 A | 5/2003 |
| JP | 2011529579 A | 12/2011 |
| JP | 2016528535 A | 9/2016 |
| JP | 2018116283 A | 7/2018 |

OTHER PUBLICATIONS

First Examination Report for Indian Patent Application No. 202147048782, mailed May 25, 2022, 8 pages.
International Search Report for International Application No. PCT/EP2020/058639 dated May 6, 2020, 5 pages.
Wabnik et al.; "Packet Loss Concealment in Predictive Audio Coding", 2005 IEEE Workshop on Applications of Signal Processing to Audio and Acoustics, Oct. 16-19, 2005, New Paltz, NY, XP10854341, pp. 227-230.
3GPP TS 26.447, V16.0.0 (Mar. 2019), 3rd Generation Partnership Project; Technical Specification Group Services and System Aspects; Codec for Enhanced Voice Services (EVS); Error Concealment of Lost Packets (Release 16), XP051698104, 82 pages.
Faller et al.; "Parametric Multichannel Audio Coding: Synthesis of Coherence Cues", IEEE Transactions on Audio, Speech, and Language Processing, vol. 14, No. 1, Jan. 2006, pp. 299-310.
Breebart et al.; "MPEG spatial audio coding / MPEG surround: Overview and current status", OAI, Oct. 2005, 18 pages.
Notice of Allowance (with English Translation) mailed Mar. 25, 2024 for Korean Patent Application No. 2021-7033589, 9 pages.
International Telecommunication Union, Series G: Transmission Systems and Media, Digital Systems and Networks—Digital terminal equipments—Coding of analogue signals; "Low-complexity, full-band audio coding for high-quality, conversational applications"; ITU-T Telecommunication Standardization Sector of ITU, G.719, Jun. 2008; 58 pages.
International Telecommunication Union, Series G: Transmission Systems and Media, Digital Systems and Networks—Digital terminal equipments—Coding of voice and audio signals; "Frame error robust narrow-band and wideband embedded variable bit-rate coding of speech and audio from 8-32 kbit/s"; ITU-T Telecommunication Standardization Sector of ITU, G.718, Jun. 2008; 257 pages.
3GPP; "Universal Mobile Telecommunications System (UMTS); LTE; EVS Codec Error Concealment of Lost Packets (3GPP TS 26.447 version 12.0.0 Release 12)"; ETSI TS 126 447 V.12.0.0; Oct. 2014; 82 pages.
Columbian Office Action, File Ref. No. NC2021/0013506, International Patent Application No. PCT/EP2020/058638, mailed Mar. 22, 2024, 8 pages.
European Office Action, European Application No. 20715049.1, mailed Oct. 11, 2024, 7 pages.
Japanese Office Action and English Translation, Japanese Patent Application No. 2024-002291, mailed Apr. 15, 2025, 8 pages.
Korean Notice of Allowance and English Translation, Korean Patent Application No. 2021-7034060, mailed Sep. 24, 2024, 9 pages.
3GPP TS 26.290, 3rd Generation Partnership Project; Technical Specification Group Service and System Aspects; Audio codec processing functions; Extended Adaptive Multi-Rate—Wideband (AMR-WB+) codec; Transcoding functions (Release 9), Sep. 2009, 85 pages.
Colombian Office Action, Colombian Patent Application No. NC2021/0013506, mailed Apr. 7, 2025, 9 pages.
Ashwin Kashyap, Mikael K. Rudberg "A low complexity packet loss concealment algorithm for G.711 and G.722", 2007, 3 pages.
Korean Office Action and English Summary, Korean Patent Application No. 2021-7034060, mailed Jan. 15, 2024, 11 pages.

* cited by examiner

METHOD AND APPARATUS FOR LOW COST ERROR RECOVERY IN PREDICTIVE CODING

CROSS REFERENCE TO RELATED APPLICATIONS

This application is a 35 U.S.C. § 371 national stage application of PCT International Application No. PCT/EP2020/058638 filed on Mar. 27, 2020, which in turn claims domestic priority to U.S. Provisional Patent Application No. 62/826,084, filed on Mar. 29, 2019 and also claims domestic priority to U.S. Provisional Patent Application No. 62/892,637, filed on Aug. 28, 2019, the disclosures and content of which are incorporated by reference herein in their entirety.

TECHNICAL FIELD

The application relates to methods and apparatuses for error recovery in predictive coding for stereo or multichannel audio encoding and decoding.

BACKGROUND

Although the capacity in telecommunication networks is continuously increasing, it is still of great interest to limit the required bandwidth per communication channel. In mobile networks smaller transmission bandwidths for each call yields lower power consumption in both the mobile device and the base station. This translates to energy and cost saving for the mobile operator, while the end user will experience prolonged battery life and increased talk-time. Further, with less consumed bandwidth per user, the mobile network can service a larger number of users in parallel.

Through modern music playback systems and movie theaters, most listeners are accustomed to high quality immersive audio. In mobile telecommunication services, the constraints on radio resources and processing delay have kept the quality at a lower level and most voice services still deliver only monaural sound. Recently, stereo and multi-channel sound for communication services has gained momentum in the context of Virtual/Mixed/Augmented Reality which requires immersive sound reproduction beyond mono. To render high quality spatial sound within the bandwidth constraints of a telecommunication network still presents a challenge. In addition, the sound reproduction also needs to cope with varying channel conditions where occasional data packets may be lost due to e.g. network congestion or poor cell coverage.

In a typical stereo recording the channel pair may show a high degree of similarity, or correlation. Some embodiments of stereo coding schemes may exploit this correlation by employing parametric coding, where a single channel is encoded with high quality and complemented with a parametric description that allows reconstruction of the full stereo image, such as the scheme discussed in C. Faller, "Parametric multichannel audio coding: synthesis of coherence cues," in IEEE Transactions on Audio, Speech, and Language Processing, vol. 14, no. 1, pp. 299-310, January 2006. The process of reducing the channel pair into a single channel is often called a down-mix and the resulting channel is often called the down-mix channel. The down-mix procedure typically tries to maintain the energy by aligning inter-channel time differences (ITD) and inter-channel phase differences (IPD) before mixing the channels. To maintain the energy balance of the input signal, the inter-channel level difference (ILD) may also be measured. The ITD, IPD and ILD may then be encoded and may be used in a reversed up-mix procedure when reconstructing the stereo channel pair at a decoder. The ITD, IPD, and ILD parameters describe the correlated components of the channel pair, while a stereo channel pair may also include a non-correlated component which cannot be reconstructed from the down-mix. This non-correlated component may be represented with an inter-channel coherence parameter (ICC). The non-correlated component may be synthesized at a stereo decoder by running the decoded down-mix channel through a decorrelator filter, which outputs a signal which has low correlation with the decoded down-mix. The strength of the decorrelated component may be controlled with the ICC parameter.

Similar principles apply for multichannel audio such as 5.1 and 7.1.4, and spatial audio representations such as Ambisonics or Spatial Audio Object Coding. The number of channels can be reduced by exploiting the correlation between the channels and bundling the reduced channel set with metadata or parameters for channel reconstruction or spatial audio rendering at the decoder.

To overcome the problem of transmission errors and lost packets, telecommunication services make use of Packet Loss Concealment (PLC) techniques. In the case that data packets are lost or corrupted due to poor connection, network congestion, etc., the missing information of lost or corrupt data packets in the receiver side may be substituted by the decoder with a synthetic signal to conceal the lost or corrupt data packet. Some embodiments of PLC techniques are often tied closely to the decoder, where the internal states can be used to produce a signal continuation or extrapolation to cover the packet loss. For a multi-mode codec having several operating modes for different signal types, there are often several PLC technologies that can be implemented to handle the concealment of the lost or corrupted data packet.

Missing or corrupted packets may be identified by the transport layer handling the connection and is signaled to the decoder as a "bad frame" through a Bad Frame Indicator (BFI), which may be in the form of a flag. The decoder may store this flag in its internal state and also keep track of the history of bad frames, e.g. a "previous bad frame indicator" (PREY BFI). Note that one transmission packet may contain one or more speech or audio frames. This means that one lost or corrupted packet will label all the frames contained therein as "bad."

For stable audio scenes, the parameters may show a high degree of similarity between adjacent frames. To exploit this similarity, predictive coding schemes may be applied. In such a scheme a prediction of the current frame parameters is derived based on the past decoded parameters, and the difference to the true parameters is encoded. A simple but efficient prediction is to use the last decoded parameters as the prediction, in which case the predictive coding scheme can be referred to as a differential encoding scheme.

One issue with the predictive coding schemes is that the schemes can be sensitive to errors. For example, if one or more elements of the predicted sequence are lost, the decoder will have a prediction error that may last a long time after the error has occurred. This problem is called error propagation and may be present in all predictive coding schemes. An illustration of error propagation is provided in FIG. 1. In FIG. 1, an absolute coding frame is lost before a sequence of consecutive predictive coding frames (i.e., a predictive coding streak). The memory, which would have been updated with parameters from the lost frame, will have previous parameters stored and thus be corrupted. Since the memory is corrupted by the frame loss, the error will last during the entire predictive coding streak and only terminate when a new absolute coding frame is received. One result of such a loss is the effect on the synthesized signal, which may be an unwanted and even drastic change in the perceived location of the source. This is particularly noticeable if the source has a static and extreme position, e.g. a sound source positioned to either the far right or the far left in a stereo scene.

One remedy is to force non-predictive coding at regular time intervals, which will terminate the error propagation. Another solution is to use a partial redundancy scheme, where a low-resolution encoding of the parameters is transmitted together with an adjacent audio frame. In case the decoder detects a frame loss in a predictive coding streak, the low-resolution parameters can be used to reduce the error propagation.

SUMMARY

One drawback of the above described predictive coding remedies is that they consume bandwidth, which is wasted bandwidth when the transmission channel is error-free.

According to some embodiments, a method is provided to replace decoded parameters in a received multichannel signal. The method includes decoding multichannel parameters of a frame of the received multichannel signal. The method further includes determining whether a bad frame is indicated. Responsive to the bad frame being indicated, the method includes determining that a parameter memory is corrupted. The method includes responsive to the bad frame not being indicated, and responsive to the parameter memory not being corrupted, deriving a location measure of a reconstructed sound source based on decoded multichannel parameters. The method includes responsive to the parameter memory being corrupted, determining, based on the location measure, whether the reconstructed sound source is stable and predominantly concentrated in a subset of channels of multichannels of the received multichannel signal. Responsive to the reconstructed sound source being concentrated in the subset of channels of the multichannels and being stable, the method includes activating parameter recovery to replace decoded multichannel parameters with stored multichannel parameters.

A potential advantage of using the parameters from memory in place of decoded parameters, is that the operations can reduce the problems of predictive coding without transmitting redundant parameter information that is wasted in error-free channel operation. Moreover, using the estimated parameters only during stable audio scenes avoids the audio scene from becoming "frozen" during unstable audio scenes in an unnatural way.

Another potential advantage of using the parameters from memory in place of decoded parameters is that the perceived location of the reproduced sound using the parameters from memory can be closer to the actual location of the sound compared to the decoded parameters when a bad frame has been indicated. In particular, using the parameters from memory may reduce undesired or unnatural shifts of the location of the sound when the source is stable and concentrated to one channel or a subset of channels.

According to some embodiments of inventive concepts, a decoder for a communication network is provided. The decoder has a processor and memory coupled with the processor, wherein the memory comprises instructions that when executed by the processor causes the processor to perform operations including decoding multichannel parameters of a frame of a received multichannel signal. The operations further include determining whether a bad frame is indicated. The operations further include responsive to the bad frame being indicated, determining that a parameter memory is corrupted. The operations further include responsive to the bad frame not being indicated, and responsive to the parameter memory not being corrupted, deriving a location measure of a reconstructed sound source based on decoded multichannel parameters. The operations further include responsive to the parameter memory being corrupted, determining, based on the location measure, whether the reconstructed sound source is stable and predominantly concentrated in a subset of channels of multichannels of the received multichannel signal. Responsive to the reconstructed sound source being concentrated in the subset of channels of the multichannels and being stable, the operations include activating parameter recovery to replace decoded multichannel parameters with stored multichannel parameters.

According to some embodiments of inventive concepts, a decoder configured to operation in a communication network is provided. The decoder is adapted to perform operations. The operations include decoding multichannel parameters of a frame of a received multichannel signal. The operations include determining whether a bad frame is indicated. The operations include responsive to the bad frame being indicated, determining that a parameter memory is corrupted. The operations include responsive to the bad frame not being indicated, and responsive to the parameter memory not being corrupted, deriving a location measure of a reconstructed sound source based on decoded multichannel parameters. The operations include responsive to the parameter memory being corrupted, determining, based on the location measure, whether the reconstructed sound source is stable and predominantly concentrated in a subset of channels of multichannels of the received multichannel signal. Responsive to the reconstructed sound source being concentrated in the subset of channels of the multichannels and being stable, the operations include activating parameter recovery to replace decoded multichannel parameters with stored multichannel parameters.

According to some embodiments of inventive concepts, a computer program including computer-executable instructions that when executed on a processor comprised in a device cause the device to perform operations is provided. The operations include decoding multichannel parameters of a frame of a received multichannel signal. The operations further include determining whether a bad frame is indicated. The operations further include responsive to the bad frame being indicated determining that a parameter memory is corrupted. The operations include responsive to the bad frame not being indicated, and responsive to the parameter memory not being corrupted, deriving a location measure of a reconstructed sound source based on decoded multichannel parameters. The operations include responsive to the parameter memory being corrupted, determining, based on the location measure, whether the reconstructed sound source is stable and predominantly concentrated in a subset of channels of multichannels of the received multichannel signal. Responsive to the reconstructed sound source being concentrated in the subset of channels of the multichannels and being stable, the operations include activating parameter recovery to replace decoded multichannel parameters with stored multichannel parameters.

According to some embodiments of inventive concepts, a computer program comprising a non-transitory computer-readable storage medium is provided, the non-transitory computer-readable storage medium having computer-executable instructions that when executed on a processor comprised in device cause the device to perform operations. The operations include decoding multichannel parameters of a frame of a received multichannel signal. The operations further include determining whether a bad frame is indicated. The operations further include responsive to the bad frame being indicated, determining that a parameter memory is corrupted. The operations include responsive to the bad frame not being indicated, and responsive to the parameter memory not being corrupted, deriving a location measure of a reconstructed sound source based on decoded multichannel parameters. The operations include responsive to the parameter memory being corrupted, determining, based on the location measure, whether the reconstructed sound source is stable and predominantly concentrated in a subset of channels of multichannels of the received multichannel signal. Responsive to the reconstructed sound source being concentrated in the subset of channels of the multichannels and being stable, the operations include activating parameter recovery to replace decoded multichannel parameters with stored multichannel parameters.

According to some embodiments of inventive concepts, an apparatus configured to substitute decoded parameters with estimated parameters in a received multichannel signal is provided. The apparatus includes at least one processor and memory communicatively coupled to the processor, said memory comprising instructions executable by the processor, which cause the processor to perform operations. The operations include decoding multichannel parameters of a frame of a received multichannel signal. The operations further include determining whether a bad frame is indicated. The operations further include responsive to the bad frame being indicated, determining that a parameter memory is corrupted. The operations include responsive to the bad frame not being indicated, and responsive to the parameter memory not being corrupted, the method includes deriving a location measure of a reconstructed sound source based on decoded multichannel parameters. The operations include responsive to the parameter memory being corrupted, determining, based on the location measure, whether the reconstructed sound source is stable and predominantly concentrated in a subset of channels of multichannels of the received multichannel signal. Responsive to the reconstructed sound source being concentrated in the subset of channels of the multichannels and being stable, the operations include activating parameter recovery to replace decoded multichannel parameters with stored multichannel parameters.

According to other embodiments of inventive concepts, a method is provided to replace decoded parameters in a received multichannel signal. The method includes determining whether the coding mode is an absolute coding mode or a predictive coding mode. The method includes responsive to the coding mode being a predictive coding mode, determining if a memory corrupted flag is set. The method includes responsive to the memory corrupted flag being set, determining whether a reconstructed sound source is a stable source and a location measure of the reconstructed sound source is predominantly concentrated in a subset of channels. The method includes responsive to the reconstructed sound source being a stable source and the location measure of the reconstructed sound source being predominantly concentrated in the subset of channels of the multichannels, substituting decoded multichannel parameters with stored multichannel parameters. The method includes responsive to the memory corrupted flag not being set, analyzing a location measure of a position of the source to update the location measure and updating the stored multichannel parameters with the decoded multichannel parameters.

According to some other embodiments of inventive concepts, a decoder for a communication network is provided. The decoder includes a processor and memory coupled with the processor, wherein the memory comprises instructions that when executed by the processor causes the processor to perform operations. The operations include determining whether the coding mode is an absolute coding mode or a predictive coding mode. The operations include responsive to the coding mode being a predictive coding mode, determining if a memory corrupted flag is set. The operations include responsive to the memory corrupted flag being set, determining whether a reconstructed sound source is a stable source and a location measure of the reconstructed sound source is predominantly concentrated in a subset of channels. The operations include responsive to the reconstructed sound source being a stable source and the location measure of the reconstructed sound source being predominantly concentrated in the subset of channels of the multichannels, substituting decoded multichannel parameters with stored multichannel parameters. The operations include responsive to the memory corrupted flag not being set, analyzing a location measure of a position of the source to update the location measure and updating the stored multichannel parameters with the decoded multichannel parameters.

According to some other embodiments of inventive concepts, a decoder configured to operate in a communication network is provided. The decoder is adapted to perform operations. The operations include determining whether the coding mode is an absolute coding mode or a predictive coding mode. The operations include responsive to the coding mode being a predictive coding mode, determining if a memory corrupted flag is set. The operations include responsive to the memory corrupted flag being set, determining whether a reconstructed sound source is a stable source and a location measure of the reconstructed sound source is predominantly concentrated in a subset of channels. The operations include responsive to the reconstructed sound source being a stable source and the location measure of the reconstructed sound source being predominantly concentrated in the subset of channels of the multichannels, substituting decoded multichannel parameters with stored multichannel parameters. The operations include responsive to the memory corrupted flag not being set, analyzing a location measure of a position of the source to update the location measure and updating the stored multichannel parameters with the decoded multichannel parameters.

According to some other embodiments of inventive concepts, a computer program comprising computer-executable instructions that when executed on a processor comprised in a device cause the device to perform operations is provided. The operations include determining whether the coding mode is an absolute coding mode or a predictive coding mode. The operations include responsive to the coding mode being a predictive coding mode, determining if a memory corrupted flag is set. The operations include responsive to the memory corrupted flag being set, determining whether a reconstructed sound source is a stable source and a location measure of the reconstructed sound source is predominantly concentrated in a subset of channels. The operations include responsive to the reconstructed sound source being a stable source and the location measure of the reconstructed sound source being predominantly concentrated in the subset of channels of the multichannels, substituting decoded multichannel parameters with stored multichannel parameters. The operations include responsive to the memory corrupted flag not being set, analyzing a location measure of a position of the source to update the location measure and updating the stored multichannel parameters with the decoded multichannel parameters.

According to some other embodiments of inventive concepts, a computer program product comprising a non-transitory computer-readable storage medium having computer-executable instructions that when executed on a processor comprised in device cause the device to perform operations is provided. The operations include determining whether the coding mode is an absolute coding mode or a predictive coding mode. The operations include responsive to the coding mode being a predictive coding mode, determining if a memory corrupted flag is set. The operations include responsive to the memory corrupted flag being set, determining whether a reconstructed sound source is a stable source and a location measure of the reconstructed sound source is predominantly concentrated in a subset of channels. The operations include responsive to the reconstructed sound source being a stable source and the location measure of the reconstructed sound source being predominantly concentrated in the subset of channels of the multichannels, substituting decoded multichannel parameters with stored multichannel parameters. The operations include responsive to the memory corrupted flag not being set, analyzing a location measure of a position of the source to update the location measure and updating the stored multichannel parameters with the decoded multichannel parameters.

According to some other embodiments of inventive concepts, an apparatus configured to substitute decoded parameters with estimated parameters in a received multichannel signal is provided. The apparatus includes at least one processor and memory communicatively coupled to the processor, said memory comprising instructions executable by the processor, which cause the processor to perform operations. The operations include determining whether the coding mode is an absolute coding mode or a predictive coding mode. The operations include responsive to the coding mode being a predictive coding mode, determining if a memory corrupted flag is set. The operations include responsive to the memory corrupted flag being set, determining whether a reconstructed sound source is a stable source and a location measure of the reconstructed sound source is predominantly concentrated in a subset of channels. The operations include responsive to the reconstructed sound source being a stable source and the location measure of the reconstructed sound source being predominantly concentrated in the subset of channels of the multichannels, substituting decoded multichannel parameters with stored multichannel parameters. The operations include responsive to the memory corrupted flag not being set, analyzing a location measure of a position of the source to update the location measure and updating the stored multichannel parameters with the decoded multichannel parameters.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
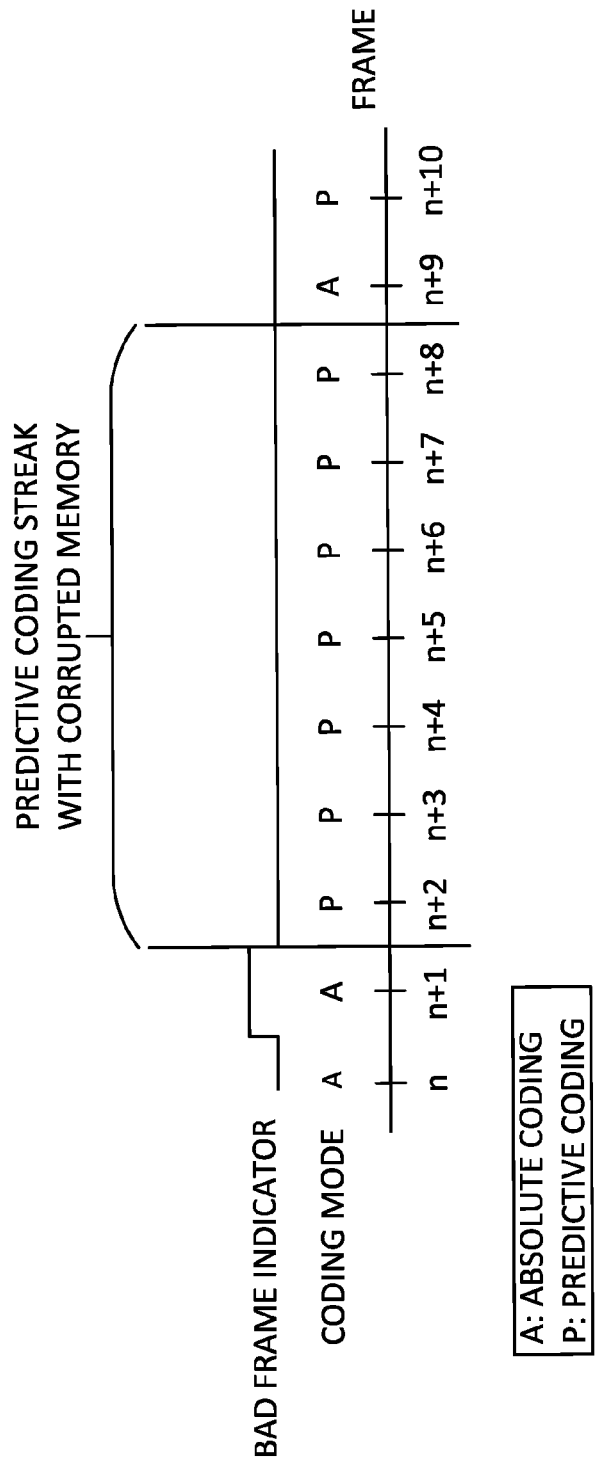
FIG. 1 is an illustration of error propagation.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The inventive concepts described maintain a memory of the last received parameters, corresponding to a source location. If the decoder detects an error in a predictive coding streak and location analysis confirms that the sound source is stable and has an extreme position (i.e., a location measure of the sound source is predominantly concentrated in a subset of channels of the multichannels of a multichannel signal being decoded), the parameters from memory may be used instead of the decoded parameters until the predictive coding streak is terminated by an absolute coding frame.

In cases where the audio scene is unstable and shows large variation in the stereo parameters, substituting the decoded parameters with the frozen estimated parameters may be annoying to the listener.

To achieve these goals, the method in one embodiment includes a location analyzer to determine a location of the source, a parameter memory to store the parameters for the last observed active source, a memory corruption detector to determine if the parameter memory is corrupt, and a decision mechanism to activate the parameter recovery (replace decoded parameters with parameters stored in memory) based on at least the history of the bad frame indicator and in a further embodiment, the output of the location analyzer. Here, an active source refers to a source which is intended to be reconstructed, such as the voice in a speech conversation. When the source is inactive (silent), the captured sound is typically dominated by background noises which are considered less relevant for the sound reconstruction. The background noise may be composed of many different sources which may render an unstable audio scene with large variation in the parametric description. This large variation should be ignored when estimating the active source location. Hence, it may be beneficial to estimate the location only when the source is active.

One advantage that may be provided by the inventive concepts include reducing the problems of channel errors during predictive coding without transmitting redundant parameter information that is wasted in error-free channel operation. Another advantage that may be provided is that parameter estimation in predictive decoding operations is not enabled for unstable audio scenes, which may result in avoiding audio scenes that are unnaturally frozen. Yet another advantage that may be provided is that it may reduce unnatural or unwanted instabilities in the location of a source when the source location is stable and concentrated to a subset of the channels of a multi-channel signal.

Figure 2:
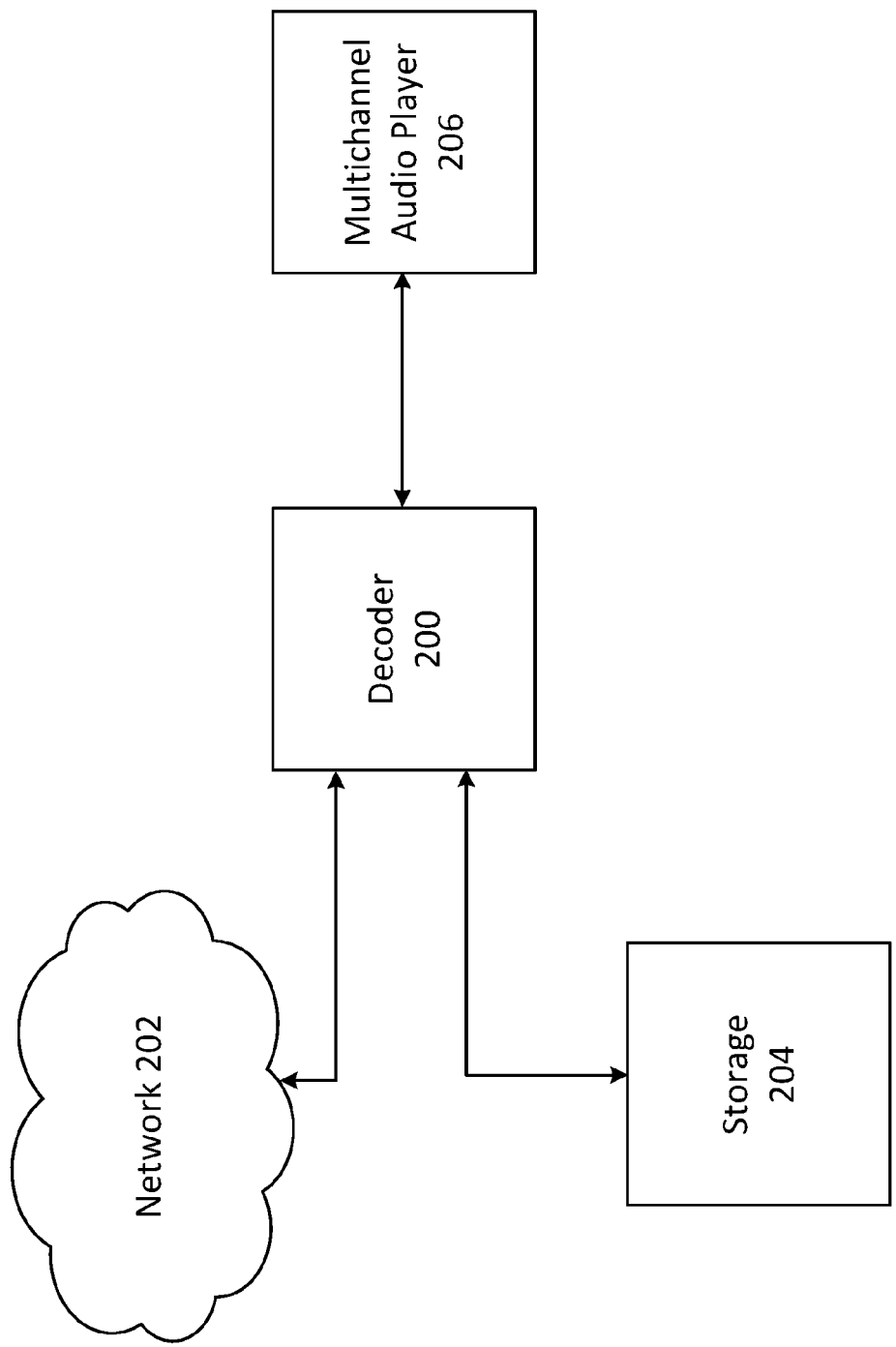
FIG. 2 is a block diagram illustrating an example of an environment of a decoder system in which error recovery in predictive coding may be performed according to some embodiments.

FIG. 2 illustrates an example of an operating environment of a decoder 200 that may be used to decode multichannel bitstreams as described herein. The decoder 200 may be part of a media player, a mobile device, a set-top device, a desktop computer, and the like. In other embodiments, the decoder 200 may be embodied in the hardware and/or software of a standalone server, a cloud-implemented server, a distributed server or as processing resources in a server farm. For example, the decoder may be part of a cloud-implemented teleconference application. The decoder 200 receives encoded bitstreams transmitted via a transport layer of a network. The bitstreams may be sent from an encoder, from a storage device 204, from a device on the cloud via network 202, etc. During operation, decoder 200 receives and processes the frames of the bitstream as described herein. The decoder 200 outputs multi-channel audio signals and may transmit the multi-channel audio signals to a multi-channel audio player 206 having at least one loudspeaker for playback of the multi-channel audio signals. Storage device 204 may be part of a storage depository of multi-channel audio signals such as a storage repository of a store or a streaming music service, a separate storage component, a component of a mobile device, etc. Multi-channel audio player may be a Bluetooth speaker, a device having at least one loudspeaker, a mobile device, a streaming music service, etc.

Figure 3:
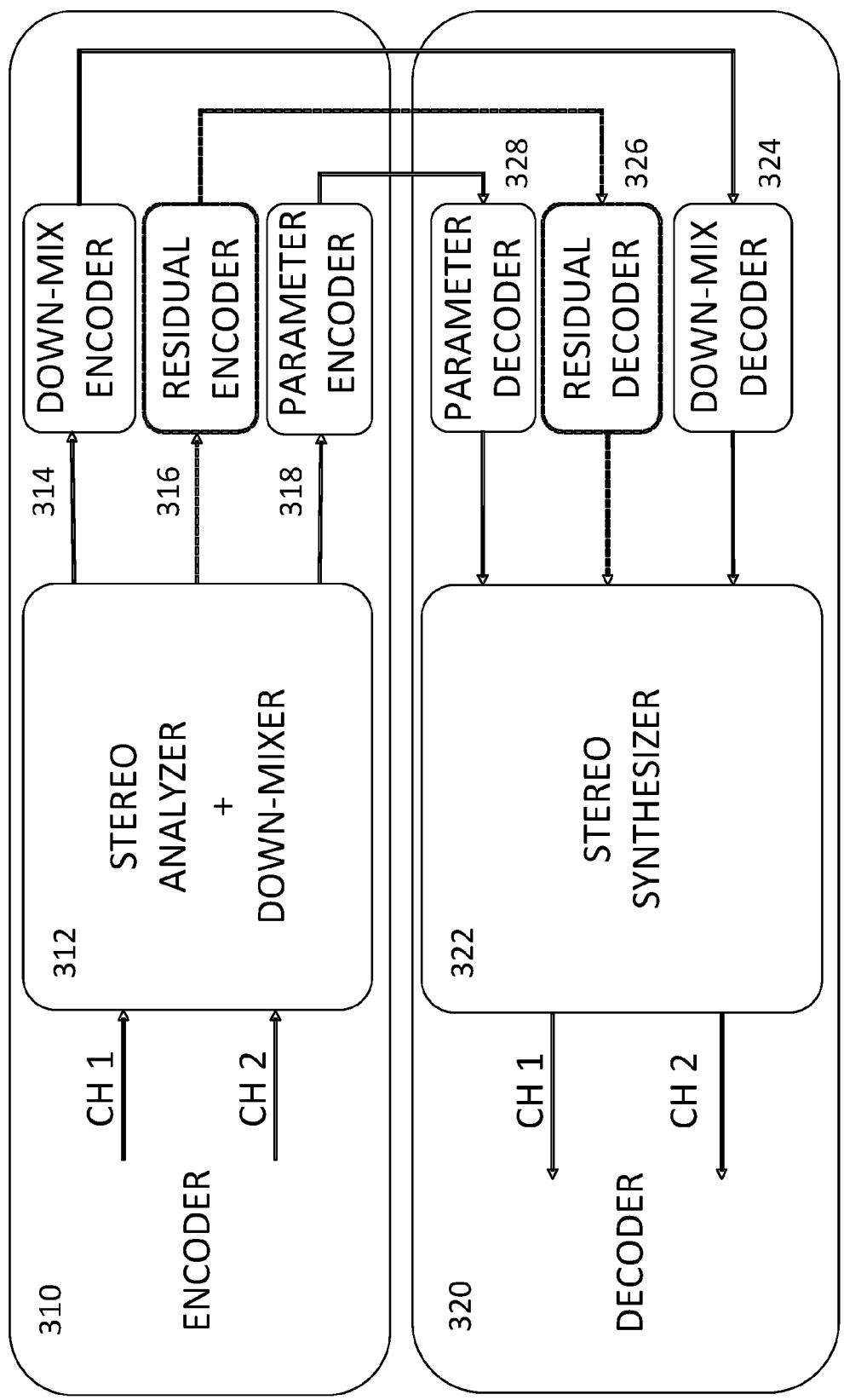
FIG. 3 is a block diagram illustrating components of a stereo encoder and decoder according to some embodiments.

While the parametric stereo reproduction gives good quality at low bitrates, the quality tends to saturate for increasing bitrates due to the limitation of the parametric model. To overcome this issue, the non-correlated component can be encoded. This encoding is achieved by simulating the stereo reconstruction in the encoder and subtracting the reconstructed signal from the input channel, producing a residual signal. If the down-mix transformation is revertible, the residual signal can be represented by only a single channel for the stereo channel case. Typically, the residual signal encoding is targeted to the lower frequencies which are psycho-acoustically more relevant while the higher frequencies can be synthesized with the decorrelator method. FIG. 3 is a block diagram depicting an embodiment of a setup for a parametric stereo codec including a residual coder. In FIG. 3, the encoder 310 may receive input signals, perform the processing described above in the stereo processing and down-mix block 312, encode the output via down-mix encoder 314, encode the residual signal via residual encoder 316, and encode the ITD, IPD, ILD, and ICC parameters via parameter encoder 318. The decoder 320 may receive the encoded output, the encoded residual signal, and the encoded parameters. The decoder 320 may decode the residual signal via residual decoder 326 and decode the down-mix signal via down-mix decoder 324. The parameter decoder 328 may decode the encoded parameters. The stereo synthesizer 322 may receive the decoded output signal and the decoded residual signal and based on the decode parameters, output stereo channels CH1 and CH2.

Figure 8:
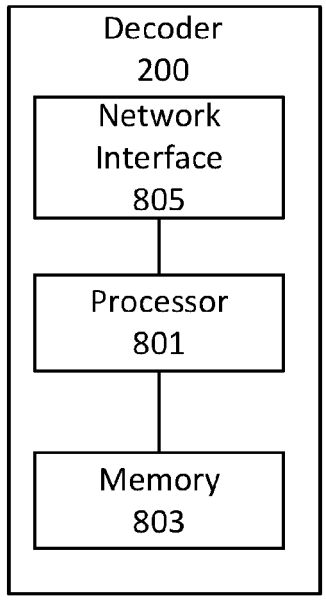
FIG. 8 is a block diagram illustrating a decoder according to some embodiments of inventive concepts.

FIG. 8 is a block diagram illustrating elements of decoder 200 configured to decode multi-channel audio frames and provide error recovery for lost or corrupt frames in predictive coding mode according to some embodiments of inventive concepts. As shown, decoder 200 may include a network interface circuit 805 (also referred to as a network interface) configured to provide communications with other devices/entities/functions/etc. The decoder 200 may also include a processor circuit 801 (also referred to as a processor) coupled to the network interface circuit 805, and a memory circuit 803 (also referred to as memory) coupled to the processor circuit. The memory circuit 803 may include computer readable program code that when executed by the processor circuit 801 causes the processor circuit to perform operations according to embodiments disclosed herein.

According to other embodiments, processor circuitry 801 may be defined to include memory so that a separate memory circuit is not required. As discussed herein, operations of the decoder 200 may be performed by processing circuitry 801 (also referred to as processor) and/or network interface circuitry 805 (also referred to as a network interface). For example, processing circuitry 801 may control network interface 805 to transmit communications to multichannel audio players 206 and/or to receive communications through network interface 805 from one or more other network nodes/entities/servers such as encoder nodes, depository servers, etc. Moreover, modules may be stored in memory circuitry 803, and these modules may provide instructions so that when instructions of a module are executed by processing circuitry 801, processing circuitry 801 performs respective operations.

In the description that follows, the stereo decoder of a stereo encoder and decoder system as outlined in FIG. 3 may be used. Two channels will be used to describe the embodiments. These embodiments may be used with more than two channels. The multi-channel encoder 310 may process the input left and right channels in segments referred to as frames. The stereo analysis and down-mix block 312 may conduct a parametric analysis and produce a down-mix. For a given frame m the two input channels may be written $$\begin{cases} l(m, n) \\ r(m, n) \end{cases}$$

where l denotes the left channel, r denotes the right channel, n=0, 1, 2, . . . , N denotes the sample number in frame m and N is the length of the frame. In an embodiment, the frames may be extracted with an overlap in the encoder such that the decoder may reconstruct the multi-channel audio signals using an overlap add strategy. The input channels may be windowed with a suitable windowing function w(n) and transformed to the Discrete Fourier Transform (DFT) domain $$\begin{cases} X_L(m,k) = \sum_{n=0}^{N-1} l(m,n)w(n)e^{-\frac{j2\pi kn}{N}} \\ X_R(m,k) = \sum_{n=0}^{N-1} r(m,n)w(n)e^{-\frac{j2\pi kn}{N}} \end{cases}$$

Note that other frequency domain representations may be used here, such as a Quadrature Mirror Filter (QMF) filter bank, a Hybrid QMF filter bank or an odd DFT (ODFT) representation which is composed of the MDCT (modified discrete cosine transform) and MDST (modified discrete cosine transform) transform components.

For the parametric analysis, the frequency spectrum may be partitioned into bands b, where each band b corresponds to a range of frequency coefficients $$k = k_{start(b)} \ldots k_{end(b)}, b = 0, 1, 2, \ldots N_{bands} - 1$$

where $N_{bands}$ denote the total number of bands. The band limits are typically set to reflect the resolution of the human auditory perception which suggests narrow bands for low frequencies and wider bands for high frequencies. Note that different band resolution may be used for different parameters.

The signals may then be analyzed to extract the ITD, IPD and ILD parameters. Note that the ILD may have a significant impact on the perceived location of a sound. In some embodiments, it may be therefore critical to reconstruct the ILD parameter with high accuracy to maintain a stable and correct location of the sound.

In addition, the channel coherence may be analyzed, and an ICC parameter may be derived. The set of multi-channel audio parameters for frame m may contain the complete set of ITD, IPD, ILD and ICC parameters used in the parametric representation. The parameters may be encoded by a parameter encoder 318 and added to the bitstream to be stored and/or transmitted to a decoder.

Before producing a down-mix channel, in one embodiment, it may be beneficial to compensate for the ITD and IPD to reduce the cancellation and maximize the energy of the down-mix. The ITD compensation may be implemented both in time domain before the frequency transform or in frequency domain, but it essentially performs a time shift on one or both channels to eliminate the ITD. The phase alignment may be implemented in different ways, but the purpose is to align the phase such that the cancellation is minimized. This ensures maximum energy in the down-mix. The ITD and IPD adjustments may be done in frequency bands or be done on the full frequency spectrum and the adjustments may be done using the quantized ITD and IPD parameters to ensure that the modification can be inverted in the decoder stage.

The embodiments described below are independent of the realization of the IPD and ITD parameter analysis and compensation. In other words, the embodiments are not dependent on how the IPD and ITP are analyzed or compensated. In such embodiments, the ITD and IPD adjusted channels may be denoted with an apostrophe ('):

$$\begin{cases} X'_L(m,k) \\ X'_R(m,k) \end{cases}$$

The ITD and IPD adjusted input channels may then be down-mixed by the parametric analysis and down-mix block 312 to produce a mid/side representation, also called a down-mix/side representation. One way to perform the down-mix is to use the sum and difference of the signals:

$$\begin{cases} X_M(m,k) = \dfrac{X'_L(m,k) + X'_R(m,k)}{2} \\ X_S(m,k) = \dfrac{X'_L(m,k) - X'_R(m,k)}{2} \end{cases}$$

The down-mix signal $X_M(m, k)$ may be encoded by down-mix encoder 314 to be stored and/or transmitted to a decoder. This encoding may be done in frequency domain, but it may also be done in time domain. In the latter case a DFT synthesis stage is required to produce a time domain version of the down-mix signal, which is in turn provided to the down-mix encoder 314. The transformation to time domain may, however, introduce a delay misalignment with the multi-channel audio parameters that would require additional handling. In one embodiment, this delay misalignment is solved by introducing additional delay or by interpolating the parameters to ensure that the decoder synthesis of the down-mix and the multi-channel audio parameters are aligned.

The reconstruction of the side signal $X_S(m, k)$ may be generated from the down-mix and the obtained multi-channel audio parameters through a local parametric synthesis. A side signal prediction $X_{\tilde{S}}(m, k)$ can be derived using the down-mix signal $$X_{\tilde{S}}(m,k) = p(X_M(m,k))$$

where $p(\cdot)$ is a predictor function and may be implemented as a single scaling factor $\alpha$ which minimizes the mean squared error (MSE) between the side signal and the predicted side signal. Further, the prediction may be applied on frequency bands and involve a prediction parameter for each frequency band b.

$$X_{\tilde{S}}(m,k) = \alpha_b X_M(m,k), k = k_{start(b)} \ldots k_{end(b)}$$

If the coefficients of band b are designated as column vectors $X_{\tilde{S},b}(m)$ and $X_{M,b}(m)$, the minimum MSE predictor can be derived as $$\alpha_b = \frac{X_{M,b}(m)^T X_{S,b}(m)}{X_{M,b}(m)^T X_{M,b}(m)}$$

However, this expression may be simplified to produce a more stable prediction parameter. Although the prediction parameter $\alpha_b$ does not represent a level difference, it may control the portion of the down-mix signal which is routed to the left and right channels. Hence, as for the ILD parameter, the prediction parameter $\alpha_b$ (m) may have a significant impact on the perceived sound location. Further details are described in the prediction mode of Breebaart, J., Herre, J., Faller, C., Rödén, J., Myburg, F., Disch, S., . . . & Oomen, W. (2005). "MPEG spatial audio coding/MPEG surround: Overview and current status," 2005 In Preprint 119th Cony. Aud. Eng. Soc. (No. LCAV-CONF-2005-029). The prediction parameter $\alpha_b$ (m) is in turn encoded using an inter-frame predictive coding scheme, where differences between the frames m are considered. For each band b a difference from the reconstructed parameters $\hat{a}_b$ (m) of the previous frame may be calculated $$\Delta\alpha_b(m) = \alpha_b(m) - \hat{a}_b(m-1)$$

The encoder may choose to encode either $\alpha_b(m)$ or $\Delta\alpha_b(m)$, depending on which of them yields the lowest bit consumption. In an embodiment, $\alpha_b(m)$ and $\Delta\alpha_b(m)$ may be quantized using a scalar quantizer followed by an entropy coder on the quantizer indices. Arithmetic coding, Huffman coding and Golomb-Rice coding are examples of coding which may be used as an entropy coder. The entropy coder would assign smaller code words to small variations, i.e. small values of $\Delta\alpha_b(m)$. This means that the predictive coding using $\Delta\alpha_b(m)$ is likely to be used for stable audio scenes. For fast scene changes, resulting in large $\Delta\alpha_b(m)$, the bit consumption for the encoding of $\alpha_b(m)$ may be lower by using a non-predictive, or absolute encoding scheme. The encoding scheme thus may have two modes:

1) ABSOLUTE: encoding of $\alpha_b(m)$, and
2) PREDICTIVE: encoding of $\Delta\alpha_b(m)$.

The encoding mode $\alpha_{mode}(m) \in \{\text{ABSOLUTE, PREDICTIVE}\}$ would need to be encoded for each frame m, such that the decoder knows if the encoded value is 1) ABSOLUTE: $\hat{\alpha}_b(m)$, or
2) PREDICTIVE: $\Delta\hat{\alpha}_b(m)$.

Further variations of this encoding scheme are possible. For instance, if the prediction parameter $\alpha_b(m)$ shows high correlation with another parameter, such as the residual coding energy or a corresponding representation, it may be beneficial to encode those parameters jointly. The important part is that when the encoding scheme has a predictive coding mode and an absolute (non-predictive) coding mode, that this decision is encoded and signaled to the decoder. A sequence of consecutive PREDICTIVE coding modes may be referred to as a "predictive coding streak" or "predictive streak" and would be observed for audio segments where the scene is stable. If an audio frame in the onset of the predictive streak is lost, the parameters may suffer from error propagation during the entire streak (see FIG. 1). To reduce the effect of error propagation, ABSOLUTE coding may be forced at regular intervals, which effectively limits the predictive streak to a maximum length in time.

After encoding, a local reconstruction of the parameter $\hat{\alpha}_b(m)$ is derived in the encoder and stored in memory to be used when encoding the next frame.

$$\hat{\alpha}_{b,mem} := \hat{\alpha}_b(m)$$

The decoding steps may be similar to the encoder steps. In the decoder:

$$\hat{\alpha}_b(m) = \begin{cases} \hat{\alpha}_b(m), & \alpha_{mode}(m) = \text{ABSOLUTE} \\ \Delta\hat{\alpha}_b(m) + \hat{\alpha}_{b,mem}, & \alpha_{mode}(m) = \text{PREDICTIVE} \end{cases}$$

While the predictive coding is described for the reconstructed values, it should be noted that it is also possible to conduct the predictive coding step on the quantizer indices. The principle of memory dependency however remains the same.

During error-free operation the local reconstruction in the encoder is identical to the reconstructed parameter $\hat{\alpha}_b(m)$ in the decoder. Note also that the memory $\hat{\alpha}_{b,mem}$ will be identical to reconstructed parameter values for frame m-1, $\hat{\alpha}_b(m-1)$. For the very first frame, the parameter memory may be set to some predefined value, e.g. all zeroes or the average expected value of the parameter.

Details on residual coding shall now be discussed. Given the predicted side signal, a prediction residual $X_R(m,k)$ can be created.

$$X_R(m,k) = X_S(m,k) - X_{\hat{S}}(m,k)$$

The prediction residual may be inputted into a residual encoder 316. The encoding may be done directly in DFT domain or it may be done in time domain. Similarly, as for the down-mix encoder, a time domain encoder would require a DFT synthesis which may require alignment of the signals in the decoder. The residual signal represents the diffuse component which is not correlated with the down-mix signal. If a residual signal is not transmitted, a solution in one embodiment may be to substitute a signal for the residual signal in the stereo synthesis state in the decoder with the signal coming from a decorrelated version of the decoded down-mix signal. The substitute is typically used for low bitrates where the bit budget is too low to represent the residual signal with any useful resolution. For intermediate bit rates, it may be common to encode a part of the residual. In this case the lower frequencies are often encoded, since they may be perceptually more relevant. For the remaining part of the spectrum, the decorrelator signal may be used as a substitute for the residual signal in the decoder. This approach is often referred to as a hybrid coding mode. Further details are provided in the decoder description below.

The representation of the encoded down-mix, the encoded multi-channel audio parameters, and the encoded residual signal may be multiplexed into a bitstream (not shown), which may be transmitted to a decoder 320 or stored in a medium for future decoding.

Within the decoder, a down-mix decoder 328 may provide a reconstructed down-mix signal $\hat{M}(m,n)$ which is segmented into DFT analysis frames m and n=0, 1, 2, ..., N−1 denote the sample numbers within frame m. The analysis frames are typically extracted with an overlap which permits an overlap-add strategy in the DFT synthesis stage. The corresponding DFT spectra may be obtained through a DFT transform $$X_{\hat{M}}(m,k) = \sum_{n=0}^{N-1} \hat{M}(m,n) w(n) e^{-\frac{j2\pi kn}{N}}$$

where w(n) denotes a suitable windowing function. The shape of the windowing function can be designed using a trade-off between frequency characteristics and algorithmic delay due to length of the overlapping regions. Similarly, a residual decoder 326 produces a reconstructed residual signal $\hat{R}(m,n)$ for frame m and time instances n=0, 1, 2, ... $N_R$−1. Note that the frame length $N_R$ may be different from N since the residual signal may be produced at a different sampling rate. Since the residual coding may be targeted only for the lower frequency range, it may be beneficial to represent it with a lower sampling rate to save memory and computational complexity. A DFT representation of the residual signal $X_{\hat{R}}(m,k)$ is obtained. Note that if the residual signal is upsampled in DFT domain to the same sampling rate as the reconstructed down-mix, the DFT coefficients will need to be scaled with $N/N_R$ and the $X_{\hat{R}}(m,k)$ would be zero-padded to match the length N. To simplify the notation, and since the embodiments are not affected by the use of different sampling rates, for purposes of better understanding, the sampling rates shall be equal and $N_R$=N in the following description. Thus, no scaling or zero-padding shall be shown.

It should be noted that the frequency transform by means of a DFT is not necessary in case the down-mix and/or the residual signal is encoded in DFT domain. In this case, the decoding of the down-mix and/or residual signal provides the DFT spectrum that are necessary for further processing.

In an error free frame, often referred to as a good frame, the multi-channel audio decoder may produce the multi-channel synthesis using the decoded down-mix signal together with the decoded multi-channel audio parameters in combination with the decoded residual signal. For the case of the prediction parameter $\alpha_b(m)$ the decoder may use the mode parameter $\alpha_{mode}(m)$ to select the appropriate decoding mode and produces the reconstructed prediction parameter $\alpha_b(m)$, $$\hat{\alpha}_b(m) = \begin{cases} \hat{\alpha}_b(m), & \alpha_{mode}(m) = \text{ABSOLUTE} \\ \Delta\hat{\alpha}_b(m) + \hat{\alpha}_{b,mem}, & \alpha_{mode}(m) = \text{PREDICTIVE} \end{cases}$$

The parameter memory is updated with the reconstructed prediction parameter $\hat{\alpha}_b(m)$.

$$\hat{\alpha}_{b,mem} := \hat{\alpha}_b(m)$$

The decoded down-mix $X_M(m,k)$, the stereo parameters and the residual signal $X_R(m,k)$ are fed to the parametric stereo synthesis block 322 to produce the reconstructed stereo signal. After the stereo synthesis in DFT domain has been applied, the left and right channels are transformed to time domain and output from the stereo decoder.

In case the decoder detects a lost or corrupted frame, the decoder may use one or several PLC modules to conceal the missing data. There may be several dedicated PLC technologies to substitute the missing information, e.g. as part of the down-mix decoder, residual decoder or the parameter decoder. The goal of the PLC is to generate an extrapolated audio segment that is similar to the missing audio segment, and to ensure smooth transitions between the correctly decoded audio before and after the lost or corrupted frame.

The PLC method for the stereo parameters may vary. An example is to simply repeat the parameters of the previously decoded frame. Another method is to use the average stereo parameters observed for a large audio database, or to slowly converge to the average stereo parameters for consecutive frame losses (burst losses). The PLC method may update the parameter memory with the concealment parameters, or it may leave the parameter memory untouched such that the last decoded parameters remain. In any case, the memory will be out-of-synch with respect to the encoder.

Figure 4:
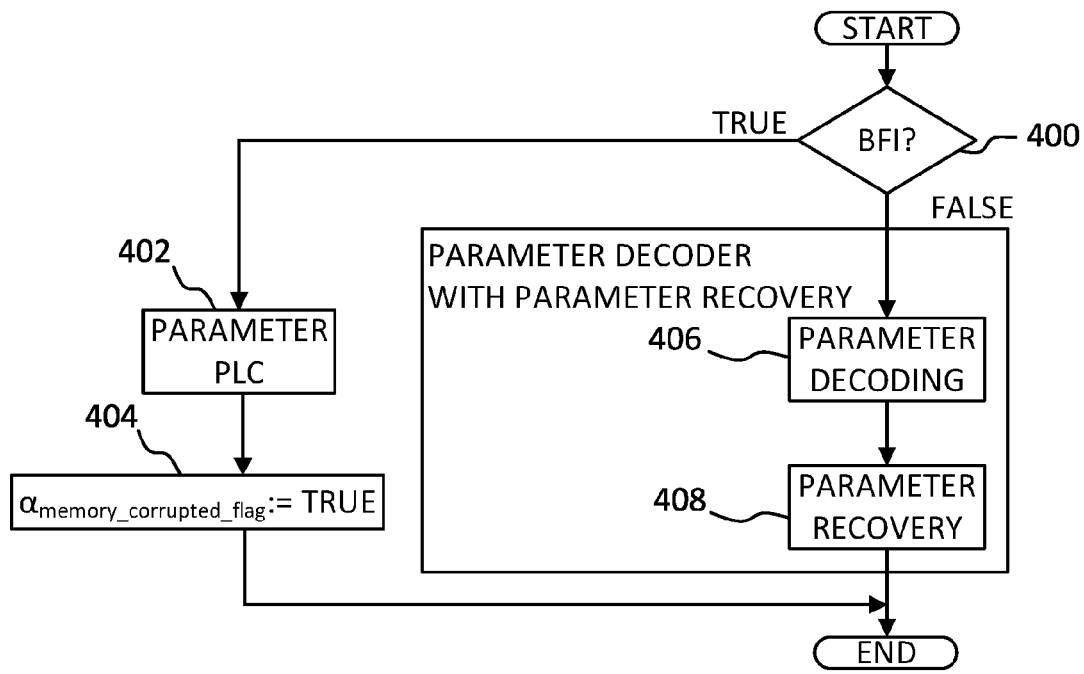
FIG. 4 is a flow chart illustrating operations of a decoder according to some embodiments of inventive concepts.

Turning to FIG. 4, a flow-chart of the decoder operation in an embodiment of predictive parametric coding recovery is provided. If a bad frame is indicated through the Bad Frame Indicator (BFI) at operation 400, the decoder may employ packet loss concealment methods at operation 402 and in some embodiments, may set a flag for indicating corruption in memory of decoded parameters in operation 404 (e.g., $\alpha_{memory\_corrupted\_flag}$:=TRUE). If the BFI is not active, normal decoding is used in operation 406. After the normal decoding, the parameter recovery operation 408 is run.

Figure 5:
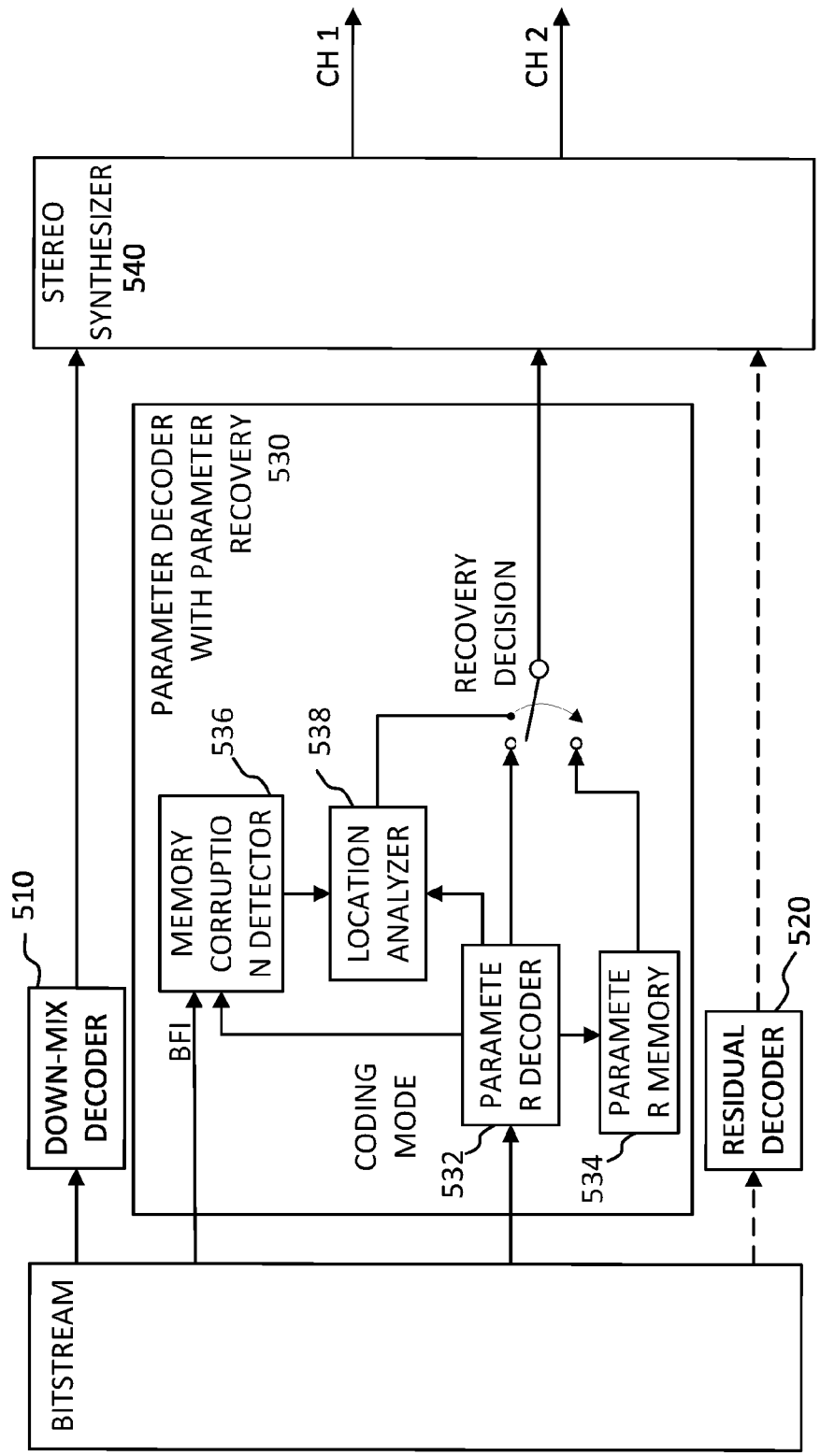
FIG. 5 is a block diagram illustrating operations of a decoder according to provide error recovery according to some embodiments of inventive concepts.

In more detail, the error-free decoding operations may be described as outlined by FIG. 5. FIG. 5 may be compared to the stereo decoder block 320 of FIG. 3. FIG. 5 provides a down-mix decoder 510 and optionally a residual decoder 520. The decoder has a parameter decoder with parameter recovery 530 that is described in more detail below.

The parameter decoder 532 may perform decoding of the stereo parameters using either an absolute coding mode or a predictive coding mode. In the description below, a reconstructed side signal prediction parameter $\hat{\alpha}_b(m)$ shall be used for the error recovery method. In the location analyzer block 538, a location measure, which expresses the position of the source, is derived. An example of a location measure is to use the mean $\bar{\alpha}(m)$ of the reconstructed prediction parameter $\hat{\alpha}_b(m)$ over all sub-bands for each frame.

$$\bar{\alpha}(m) = \frac{1}{N_{bands}} \sum_{b=0}^{N_{bands}-1} \hat{\alpha}_b(m)$$

The recovery solution is to be activated when the position is extreme and static (or stable). The extreme position may be manifested as a concentration of signal power to a certain channel or direction, where a shift in the direction of the concentrated energy has a large impact on the perceived position. For example, in a stereo signal, the extreme position represents a source concentrated in either the left or the right channel. In other words, the location measure of the source (e.g., reconstructed source signal) is predominantly concentrated in a subset of the channels of the multichannels. For a stereo signal, the location measure of the source would be predominantly concentrated in one of the two channels. An activation mechanism may be based on a low-pass filtered position, e.g.

$$\bar{\alpha}_{LP}(m) = \begin{cases} \gamma\bar{\alpha}(m) + (1-\gamma)\bar{\alpha}_{LP}(m-1), & |\bar{\alpha}(m)| > \bar{\alpha}_{THR} \\ 0, & \text{otherwise} \end{cases}$$

Here, any position value below the threshold $\bar{a}_{THR}$ will reset $\bar{\alpha}_{LP}(m)$ to zero.

A suitable value for the filter parameter $\gamma$ may be $\gamma=0.425$ or be in the range [0.3,0.7]. An extreme location decision P(m) may be formed by comparing the low-pass filtered position to a fixed threshold, $$P(m) = \begin{cases} 1, & |\bar{\alpha}(m)| > \bar{\alpha}_{THR} \\ 0, & \text{otherwise} \end{cases}$$

where $\bar{a}_{THR}$ depends on the range of the parameter $\bar{\alpha}$. Here, the range for $\alpha_b$, consequently $\bar{\alpha}$, is [−1.0,1.0] and suitable value for $\bar{\alpha}_{THR}$ is 0.4. In other words, a P(m) equal to 1 indicates that the sound source is a stable source which is panned either to left or right channel and thus is at an extreme position. Thus, with the $\bar{\alpha}_{THR}$ value being 0.4, any value of $\bar{\alpha}_{LP}(m)$ being above 0.4 or below −0.4 (i.e., | $\bar{\alpha}_{LP}(m)$|>0.4) would indicate that the sound source is at an extreme position (e.g., the location measure is predominantly concentrated in either the left channel or the right channel). The value for $\bar{\alpha}_{THR}$ may be set to other values.

The location measure described above provides a solution that is a computationally simple implementation. However, it may make sense from a perceptual perspective to include a weighting of the parameter differences which takes the band energy of the down-mix into account. Furthermore, the weighting coefficients can be normalized to [0.0, 1.0] range so that $\bar{\alpha}$ remains in the range of [−0.1, 0.1]. Therefore, an alternative expression for the location may be:

$$\bar{\alpha}_w(m) = \frac{1}{N_{bands}} \sum_{b=0}^{N_{bands}-1} \hat{\alpha}_b(m) \cdot \tilde{w}_b(m)$$

-continued $$w_b(m) = \frac{1}{k_{end(b)} - k_{start(b)} + 1} \sum_{k=k_{start(b)}}^{k_{end(b)}} X_{\hat{M}}(m, k)^2$$

$$\tilde{w}_b(m) = \frac{w_b(m) - \min(w_0 \ldots N_{bands}-1(m))}{\max(w_0 \ldots N_{bands}-1(m)) - \min(w_0 \ldots N_{bands}-1(m))}$$

where $\bar{\alpha}_w(m)$ is the weighted location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m, k)$ is a transformed down-mix signal.

The above expression emphasizes the high energy bands in the panning measure $\bar{\alpha}(m)$. With applying weighting to $\bar{\alpha}$, there might be a need of re-optimizing the filter parameter γ. It may further be desirable to update the location measure only during frames that are classified as coming from an active source, or to normalize the weighting with an estimate of the current peak energy or noise floor level.

The recovery decision logic depends on outputs from memory corruption detector 536 and location analyzer 538. The memory corruption detector 536 may use at least the coding mode of parameters (predictive/absolute) and the bad frame indicator (BFI) in the detection of memory corruption. The recovery decision logic can be further described by a state machine as outlined in FIG. 6.

Figure 6:
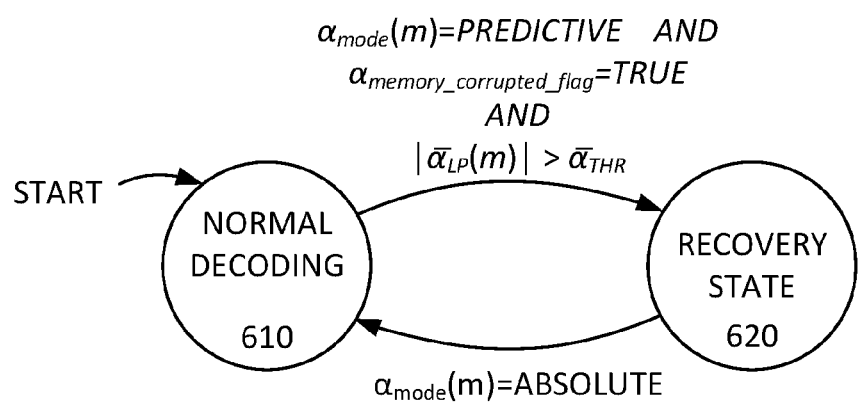
FIG. 6 is a block diagram illustrating a state machine according to some embodiments of inventive concepts.

Turning to FIG. 6, the starting state 610 represents the normal decoding mode. In case the decoder is in a predictive mode $\alpha_{mode}$=PREDICTIVE and, the previous frame was a bad frame which technically means the memory of the parameters $\hat{\alpha}_{b,mem}$ is corrupted ($\alpha_{memory\_corrupted\_flag}$:=TRUE) and the audio has an extreme and stable position ($|\bar{\alpha}_{LP}(m)| \geq \bar{\alpha}_{THR}$), the recovery state 620 is entered. If, while in the recovery state 620, the decoder enters into an absolute decoding mode $\alpha_{mode}$=ABSOLUTE, the normal decoding state 610 is entered.

In the recovery state 620, the decoded parameters are substituted with the parameters stored in memory:

$$\hat{\alpha}_b(m) := \hat{\alpha}_{b,mem}$$

Since the parameters $\hat{\alpha}_b(m)$ are now from memory, it may be preferable to not update the parameter memory and position measure. Effectively, this means $\bar{\alpha}_{LP}(m) = \bar{\alpha}_{LP}(m-1)$.

Returning to FIG. 5, the output of the parameter decoder with parameter recovery block 530 is input to the stereo synthesizer block 540 together with the output of the down-mix decoder block 510 and potentially the residual decoder block 520 for the stereo synthesizer block 540 to synthesize audio signals to output on channels CH1 and/or CH2.

Figure 7:
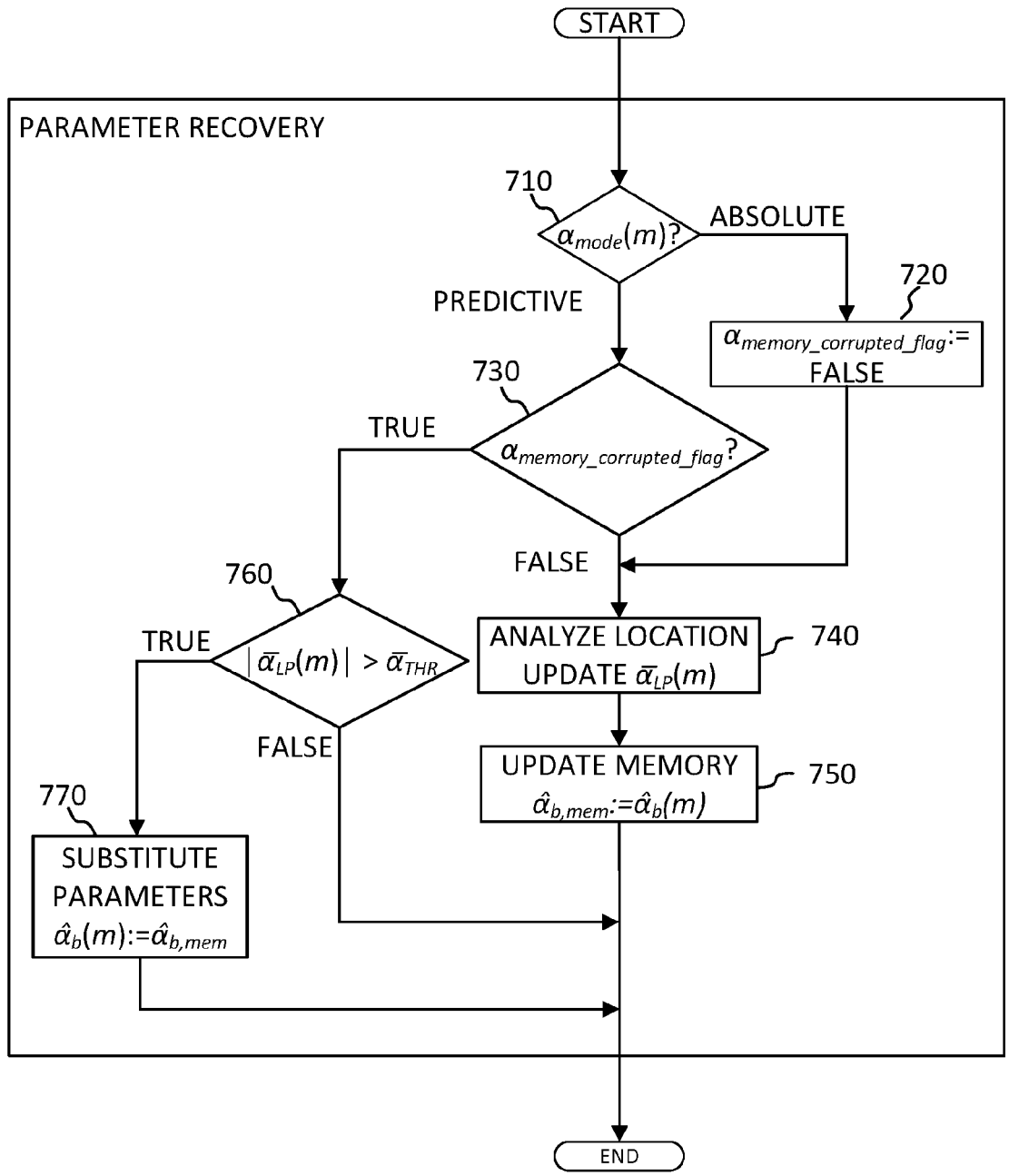
FIG. 7 is a block diagram illustrating operations to generate substitute parameters according to some embodiments of inventive concepts.

The operation of parameter recovery can also be described by the flow-chart of FIG. 7. Turning now to FIG. 7, in operation 710, the $\alpha_{mode}(m)$ parameter may be checked to determine if the coding mode is absolute or predictive.

Responsive to the coding mode being an absolute coding mode, in operation 720, the flag for indicating memory corruption may be unset e.g., $\alpha_{memory\_corrupted\_flag}$:=FALSE.

Responsive to the coding mode being a predictive coding mode, in operation 730, the memory status may be checked. If the parameter memory is not corrupted (e.g., $\alpha_{memory\_corrupted\_flag}$=FALSE), the location of the sound source may be analyzed in operation 740. That is, $\bar{\alpha}_{LP}(m)$ may be updated.

In operation 750, the memory of decoded parameters may be updated. Responsive to the parameter memory being corrupted (e.g., $\alpha_{memory\_corrupted\_flag}$=TRUE), in operation 760, a determination is made as to whether or not the sound source is a stable source with an extreme position (e.g., $|\bar{\alpha}_{LP}(m)| > \bar{\alpha}_{THR}$ indicating the location measure is predominantly concentrated in a subset of channels of the multichannel system).

In operation 770, responsive to the sound source being a stable source with an extreme position, decoded parameters are substituted with the memory of decoded parameters.

Figure 9:
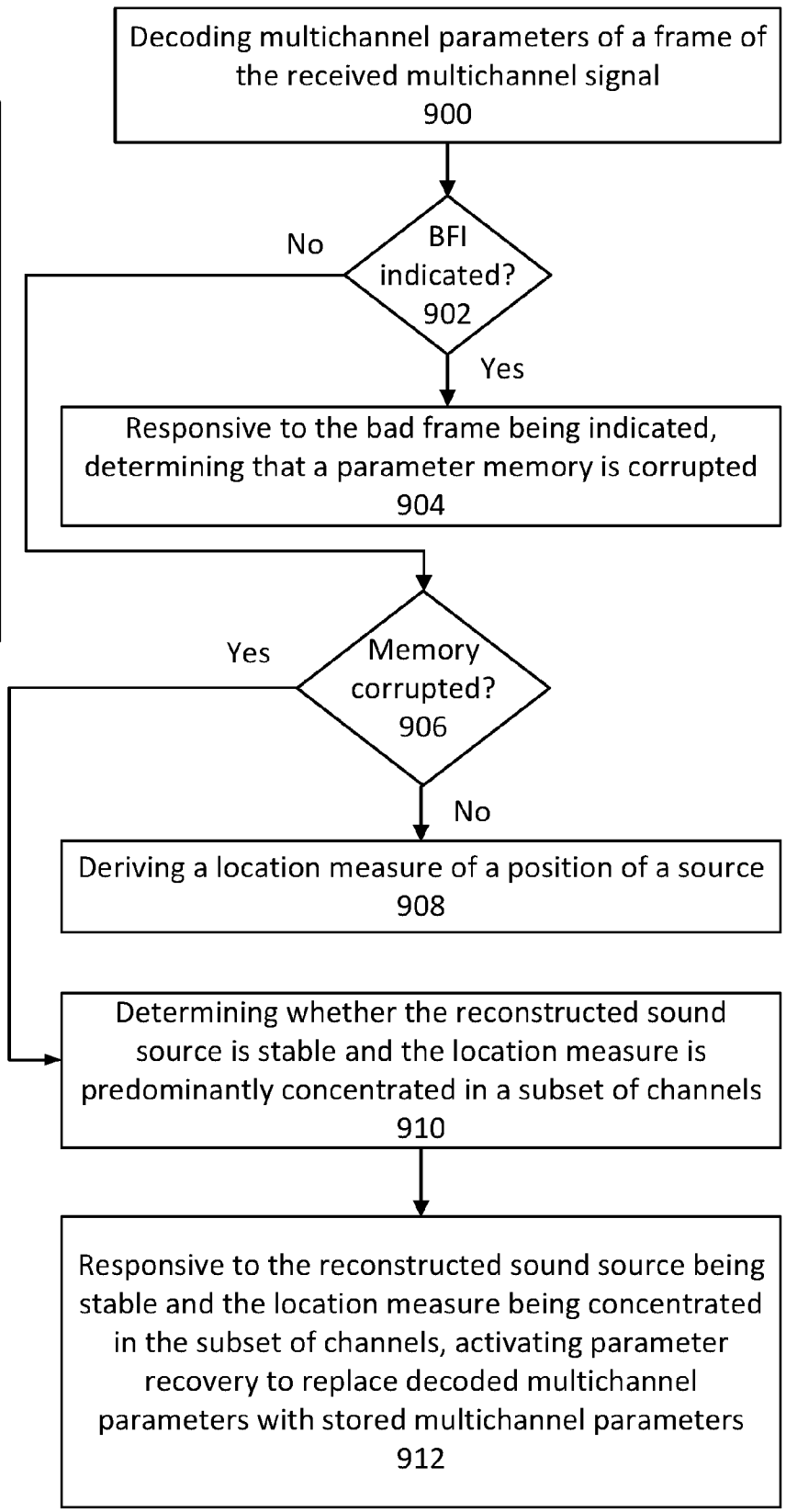
FIGS. 9-10 are flow charts illustrating operations of a decoder in accordance with some embodiments of inventive concepts.

The operation of the decoder with parameter recovery can also be described by the flow-chart in FIG. 9. In operation 900 the processing circuitry 801 of decoder 200 may decode multichannel parameters of a frame of the received multichannel signal. This operation may be similar to operation 406 of FIG. 4. In operation 902, the decoder 200 may determine whether a bad frame is indicated. This operation may be similar to operation 400 of FIG. 4. In one embodiment, this may be a flag derived from a flag in a data packet message.

Responsive to the bad frame being indicated, the processing circuitry 801 may perform packet loss concealment operations in operation 904. This operation may be similar to operation 402 of FIG. 4. For example, the packet loss concealment operations described above with respect to FIG. 3 may be performed in operation 904.

In operation 906, the processing circuitry 801 may determine, based on at least a coding mode and a previous bad frame indicator, whether a parameter memory is corrupted. This operation may be similar to operation 730 of FIG. 7. In one embodiment, the coding mode may be one of an absolute coding mode or a predictive coding mode. In this embodiment, the determining is based on the coding mode being the predictive coding mode. Thus, determining, based on at least a coding mode and a previous bad frame indicator, whether a parameter memory is corrupted is determined based on the coding mode being the predictive coding mode and the previous bad frame indicator.

In operation 908, the processing circuitry 801 may derive a location measure of a position of the source based on decoded multichannel parameters. This operation may be similar to operation 740 of FIG. 7. In one embodiment, the location measure may be derived based on $$\bar{\alpha}(m) = \frac{1}{N_{bands}} \sum_{b=0}^{N_{bands}-1} \hat{\alpha}_b(m)$$

where $\bar{\alpha}(m)$ is the location measure, which comprises a mean of a reconstructed prediction parameter $\hat{\alpha}_b(m)$ over all sub-bands for each frame m and $N_{bands}$ is a number of sub bands in frame m.

In other embodiments, the location measure may be derived based on $$\bar{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m, k)^2$$

$$\tilde{w}_b(m) = \frac{w_b(m) - \min(w_0 \ldots N_{bands}-1(m))}{\max(w_0 \ldots N_{bands}-1(m)) - \min(w_0 \ldots N_{bands}-1(m))}$$

where $\bar{\alpha}(m)$ is the location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_M(m, k)$ is a transformed down-mix signal.

In operation 910, the processing circuitry 801 may determine, whether the reconstructed sound source is stable and the location measure is predominantly concentrated in a subset of channels of the multichannels of the received multichannel signal. This operation may be similar to operation 760 of FIG. 7. In one embodiment, determining whether the reconstructed sound source is stable and the location measure is predominantly concentrated in a subset of channels of the multichannels includes determining whether the low-pass filtered position is above a threshold and responsive to the low-pass filtered position being above the threshold, determining that the location measure is predominantly concentrated in a subset of channels of the multichannels. The low-pass filtered position may be determined based on $$\bar{\alpha}_{LP}(m) = \begin{cases} \gamma\bar{\alpha}(m) + (1-\gamma)\bar{\alpha}_{LP}(m-1), & |\bar{\alpha}(m)| > \bar{\alpha}_{THR} \\ 0, & \text{otherwise} \end{cases}$$

where γ is a filter parameter, $\bar{\alpha}(m)$ is a mean of a reconstructed prediction parameter for frame m and $\bar{\alpha}_{LP}(m)$ is the low-pass filtered position.

When the multichannels are two channels (e.g., a stereo system with left and right channels), the determining whether the location measure is predominantly concentrated in a subset of channels of multichannels of the received multichannel signal includes determining whether the location measure is predominantly concentrated in one of the two channels.

In operation 912, the processing circuitry 801 may, responsive to the location measure of the reconstructed sound source being concentrated in the subset of channels of the multichannels and the reconstructed sound source being stable and the parameter memory being corrupted, activate parameter recovery to replace decoded multichannel parameters with stored multichannel parameters. This operation may be similar to operation 770 of FIG. 7.

Figure 10:
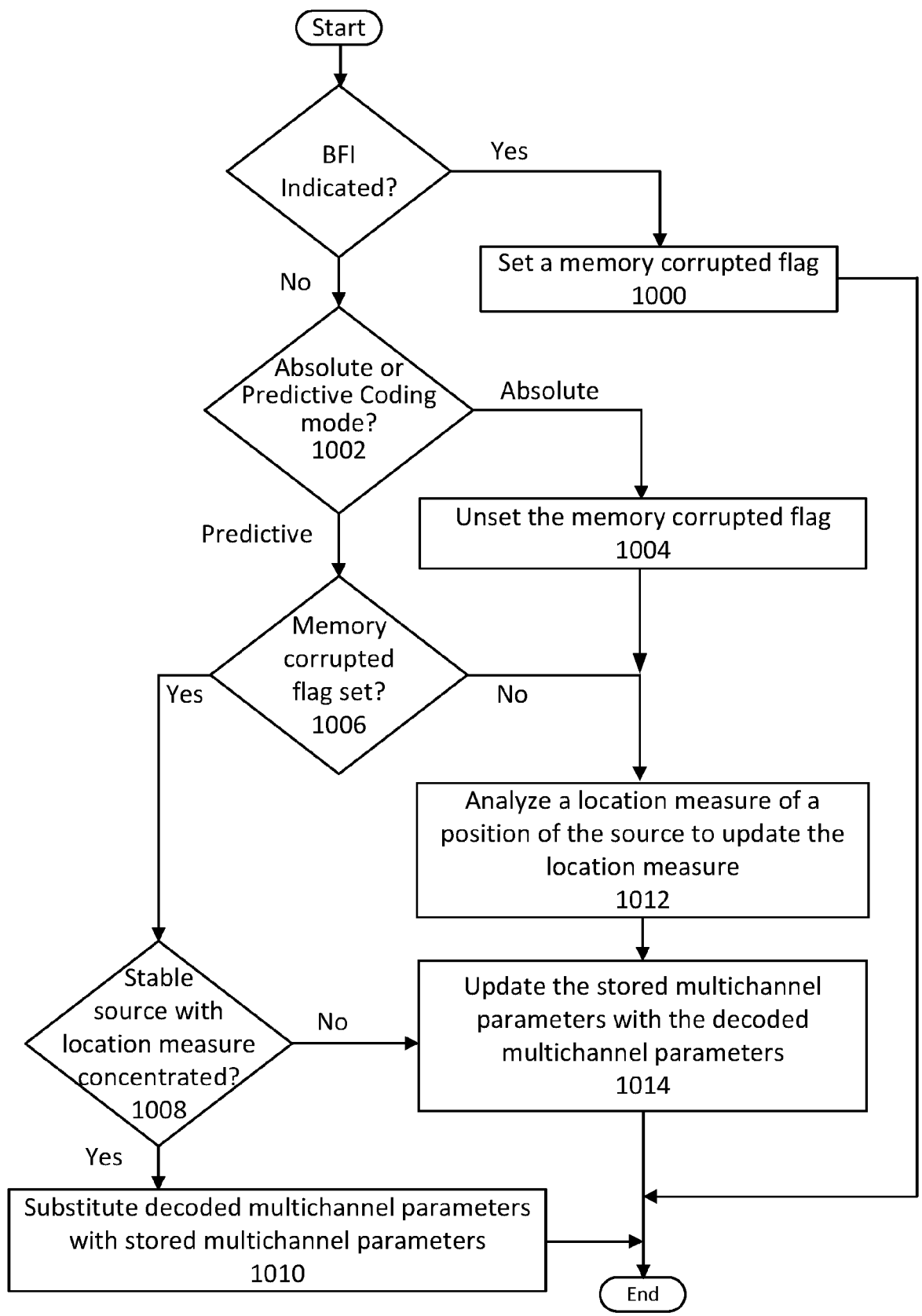

The operation of the decoder with parameter recovery can also be further described by the flow-chart in FIG. 10.

When a bad frame is indicated, one or more PLC methods are used to determine parameters. The bad frame may by indicated by a BFI flag that signals that a bad frame has been received. In operation 1000, the processing circuitry 801 may, responsive to a bad frame being indicated, set a memory corrupted flag to indicate that the memory of the parameters is corrupted.

When a bad frame is not indicated, parameter decoder operation with parameter recovery is used. In operation 1002, the processing circuitry 801 of decoder 200 may determine whether the coding mode is an absolute decoding mode or a predictive coding mode. The decoder 200 may receive the coding mode from the encoder. This operation may be similar to operation 710 of FIG. 7.

Responsive to coding mode being in an absolute coding mode, the processing circuitry 801 in operation 1004 unsets a memory corrupted flag. The memory corrupted flag may be used to indicate that the memory of the parameters is corrupted. This can occur when the previous frame to a frame currently being decoded was a bad frame, which means that the memory of the parameters is corrupted. An example of setting a memory corrupted flag is also illustrated in FIG. 4.

Responsive to the coding mode being in a predictive coding mode, the processing circuitry 801 in operation 1006 may determine if the memory corrupted flag is set. This operation may be similar to operation 730 of FIG. 7.

Responsive to the memory corrupted flag being set, the processing circuitry 801 in operation 1008 may determine whether a reconstructed sound source is a stable sound source and a location measure of the reconstructed sound source is predominantly concentrated in a subset of channels of a multichannel signal being decoded. This operation may be similar to operation 760 of FIG. 7. In one embodiment, this determining whether the location measure of the reconstructed sound source is predominantly concentrated in the subset of channels includes determining whether the absolute value of a low-pass filtered position is above a threshold and responsive to the absolute value of the low-pass filtered position being above the threshold, determining that the location measure of the reconstructed sound source is predominantly concentrated in a subset of channels. The low-pass filtered position may be determined based on $$\bar{\alpha}_{LP}(m) = \begin{cases} \gamma\bar{\alpha}(m) + (1-\gamma)\bar{\alpha}_{LP}(m-1), & |\bar{\alpha}(m)| > \bar{\alpha}_{THR} \\ 0, & \text{otherwise} \end{cases}$$

where γ is a filter parameter, $\bar{\alpha}(m)$ is a mean of a reconstructed prediction parameter for frame m and $\alpha_{LP}(m)$ is the low-pass filtered position.

When the multichannels are two channels (e.g., a stereo system with left and right channels), the determining whether the location measure of the reconstructed sound source is predominantly concentrated in a subset of channels includes determining whether the location measure of the reconstructed sound source is predominantly concentrated in one of the two channels.

In operation 1010, the processing circuitry 801 may, responsive to the reconstructed sound source being a stable source and the location measure of the reconstructed sound source being predominantly concentrated in the subset of channels of the multichannels, substitute decoded multichannel parameters with stored multichannel parameters. This operation may be similar to operation 770 of FIG. 7.

Responsive to the memory corrupted flag not being set, the processing circuitry 801 may analyze a location measure of a position of the source to update the location measure in operation 1012. This operation may be similar to operation 740 of FIG. 7. In one embodiment, updating the location measure may be updating the location measure based on $$\bar{\alpha}(m) = \frac{1}{N_{bands}} \sum_{b=0}^{N_{bands}-1} \hat{\alpha}_b(m)$$

where $\bar{\alpha}(m)$ is the location measure, which comprises a mean of a reconstructed prediction parameter $\hat{\alpha}_b(m)$ over all sub-bands for each frame m and $N_{bands}$ is a number of sub bands in frame m.

In other embodiments, updating the location measure may be updating the location measure based on $$\bar{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m, k)^2$$

$$\tilde{w}_b(m) = \frac{w_b(m) - \min(w_0 \dots N_{bands}-1(m))}{\max(w_0 \dots N_{bands}-1(m)) - \min(w_0 \dots N_{bands}-1(m))}$$

where $\bar{\alpha}(m)$ is the location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m, k)$ is a transformed down-mix signal.

Responsive to the memory corrupted flag not being set, the processing circuitry 801 in operation 1014 may update the stored multichannel parameters with the decoded multichannel parameters. This operation may be similar to operation 750 of FIG. 7.

The description above describes the parameter recovery using the decoder 200. A potential advantage of using the parameters from memory in place of decoded parameters, is that the operations can reduce the problems of predictive coding without transmitting redundant parameter information that is wasted in error-free channel operation. Moreover, using the estimated parameters only during stable audio scenes avoids the audio scene from becoming "frozen" during unstable audio scenes in an unnatural way.

Another potential advantage of using the parameters from memory in place of decoded parameters is that the perceived location of the reproduced sound using the parameters from memory can be closer to the actual location of the sound compared to the decoded parameters when a bad frame has been indicated.

LISTING OF EMBODIMENTS

1. A method of replacing decoded parameters in a received multichannel signal, the method comprising:
   decoding (900) multichannel parameters of a frame of the received multichannel signal;
   determining (902) whether a bad frame is indicated;
   responsive to the bad frame being indicated, performing (904) packet loss concealment operations;
   responsive to the bad frame not being indicated:
      determining (906), based on at least a coding mode and a previous bad frame indicator, whether a parameter memory is corrupted;
      deriving (908) a location measure of a reconstructed sound source based on decoded multichannel parameters;
      determining (910), based on the location measure, whether the reconstructed sound source is stable and predominantly concentrated in a subset of channels of multichannels of the received multichannel signal;
      responsive to the location measure of the reconstructed sound source being concentrated in the subset of channels of the multichannels and is stable and the parameter memory being corrupted, activating (912) parameter recovery to replace decoded multichannel parameters with stored multichannel parameters.

2. The method of Embodiment 1 wherein the multichannels comprises two channels and determining (910), based on the location measure, whether the location measure of the reconstructed sound source is predominantly concentrated in the subset of channels of the multichannels comprises determining (910), based on the location measure, whether the location measure of the reconstructed sound source is predominantly concentrated in one of the two channels.

3. The method of any of Embodiments 1-2, wherein the coding mode comprises one of an absolute coding mode and a predictive coding mode and wherein determining, based on at least the coding mode and the previous bad frame indicator, whether the parameter memory is corrupted comprises determining, based on the coding mode being the predictive coding mode and the previous bad frame indicator, whether the parameter memory is corrupted.

4. The method of any of Embodiments 1-3, wherein deriving the location measure comprises deriving the location measure based on $$\bar{\alpha}(m) = \frac{1}{N_{bands}} \sum_{b=0}^{N_{bands}-1} \hat{\alpha}_b(m)$$

where $\bar{\alpha}(m)$ is the location measure, which comprises a mean of a reconstructed prediction parameter $\hat{\alpha}_b(m)$ over all sub-bands for each frame m and $N_{bands}$ is a number of sub-bands in frame m.

5. The method of Embodiment 4 wherein determining whether the location measure of the reconstructed sound source is predominantly concentrated in a subset of channels of the multichannels comprises:
   determining a low-pass filtered position based on $$\bar{\alpha}_{LP}(m) = \begin{cases} \gamma\bar{\alpha}(m) + (1-\gamma)\bar{\alpha}_{LP}(m-1), & |\bar{\alpha}(m)| > \bar{\alpha}_{THR} \\ 0, & \text{otherwise} \end{cases}$$

where $\gamma$ is a filter parameter, $\bar{\alpha}(m)$ is a mean of a reconstructed prediction parameter for frame m and $\bar{\alpha}_{LP}(m)$ is the low-pass filtered position;
   determining whether an absolute value of the low-pass filtered position is above a threshold $\bar{\alpha}_{THR}$;
   responsive to the absolute value of the low-pass filtered position being above the threshold $\bar{\alpha}_{THR}$, determining that the location measure of the sound source is predominantly concentrated in a subset of channels of the multichannels.

6. The method of Embodiment 1, wherein deriving the location measure comprises deriving the location measure based on $$\bar{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m, k)^2$$

$$\tilde{w}_b(m) = \frac{w_b(m) - \min(w_0 \dots N_{bands}-1(m))}{\max(w_0 \dots N_{bands}-1(m)) - \min(w_0 \dots N_{bands}-1(m))}$$

where $\bar{\alpha}(m)$ is the location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m, k)$ is a transformed down-mix signal.

7. A method of replacing decoded multichannel parameters with stored multichannel parameters, the method comprising:

determining (1002) whether a coding mode is an absolute coding mode or a predictive coding mode;
responsive to the coding mode being a predictive coding mode:
  determining (1006) if a memory corrupted flag is set;
responsive to the memory corrupted flag being set:
  determining (1008) whether a reconstructed sound source is a stable sound source and a location measure of the reconstructed sound source is predominantly concentrated in a subset of channels of multichannels of a multichannel signal being decoded;
  responsive to the reconstructed sound source being a stable sound source and the location measure of the reconstructed sound source being predominantly concentrated in the subset of the channels of the multichannels, substituting (1010) decoded multichannel parameters with stored multichannel parameters;
responsive to the memory corrupted flag not being set:
  analyzing (1012) the location measure of the reconstructed sound source to update the location measure; and
  updating (1014) the stored multichannel parameters with the decoded multichannel parameters.

8. The method of Embodiment 7 wherein the multichannels comprises two channels and determining whether the location measure of the reconstructed sound source is predominantly concentrated in a subset of channels comprises determining (910) whether the location measure of the reconstructed sound source is predominantly concentrated in one of the two channels.

9. The method of any of Embodiments 7-8 further comprising:

responsive to the coding mode being an absolute coding mode, unsetting (1004) the memory corrupted flag.

10. The method of any of Embodiments 7-9 further comprising:

responsive to a bad frame being indicated, setting (1000) the memory corrupted flag.

11. The method of any of Embodiments 7-10 wherein updating the location measure comprises updating the location measure based on $$\bar{\alpha}(m) = \frac{1}{N_{bands}} \sum_{b=0}^{N_{bands}-1} \hat{\alpha}_b(m)$$

where $\bar{\alpha}(m)$ is the location measure, which comprises a mean of a reconstructed prediction parameter $\hat{\alpha}_b(m)$ over all sub-bands for each frame m and $N_{bands}$ is a number of sub-bands in frame m.

12. The method of Embodiment 11 wherein determining whether the location measure of the reconstructed sound source is predominantly concentrated in a subset of channels comprises:

determining a low-pass filtered position based on $$\bar{\alpha}_{LP}(m) = \begin{cases} \gamma\bar{\alpha}(m) + (1-\gamma)\bar{\alpha}_{LP}(m-1), & |\bar{\alpha}(m)| > \bar{\alpha}_{THR} \\ 0, & \text{otherwise} \end{cases}$$

where $\gamma$ is a filter parameter, $\bar{\alpha}(m)$ is a mean of a reconstructed prediction parameter for frame m and $\bar{\alpha}_{LP}(m)$ is the low-pass filtered position;

determining whether an absolute value of the low-pass filtered position is above a threshold $\bar{\alpha}_{THR}$;

responsive to the absolute value of the low-pass filtered position being above the threshold $\bar{\alpha}_{THR}$, determining that the location measure of the reconstructed sound source is predominantly concentrated in a subset of channels.

13. The method of Embodiment 7, wherein deriving the location measure comprises deriving the location measure based on $$\bar{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m, k)^2$$

$$\tilde{w}_b(m) = \frac{w_b(m) - \min(w_0 \ldots N_{bands}-1(m))}{\max(w_0 \ldots N_{bands}-1(m)) - \min(w_0 \ldots N_{bands}-1(m))}$$

where $\bar{\alpha}(m)$ is the location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m, k)$ is a transformed down-mix signal.

14. A decoder (200) for a communication network, the decoder (100) comprising:

a processor (801); and
memory (803) coupled with the processor, wherein the memory comprises instructions that when executed by the processor causes the processor to perform operations according to any of Embodiments 1-13.

15. A decoder (200) configured to operate in a communication network, wherein the decoder is adapted to perform according to any of Embodiments 1-13.

16. A computer program comprising computer-executable instructions configured to cause a device to perform the method according to any one of Embodiments 1-13, when the computer-executable instructions are executed on a processor (801) comprised in the device.

17. A computer program product comprising a non-transitory computer-readable storage medium (803), the non-transitory computer-readable storage medium having computer-executable instructions configured to cause a device to perform the method according to any one of Embodiments 1-13 when the computer-executable instructions are executed on a processor (801) comprised in the device.

18. An apparatus configured to substitute decoded parameters with estimated parameters in a received multichannel signal, the apparatus comprising:

at least one processor (801);

memory (803) communicatively coupled to the processor, said memory comprising instructions executable by the processor, which cause the processor to perform operations comprising:

decoding (900) multichannel parameters of a frame of the received multichannel signal using one of an absolute coding mode or a predictive coding mode;

determining (902) whether a bad frame is indicated;

responsive to the bad frame being indicated, perform packet loss concealment operations;

responsive to the bad frame not being indicated:

determining (906), based on at least a coding mode and a previous bad frame indicator, whether a parameter memory is corrupted;

deriving (908) a location measure of a reconstructed sound source based on decoded multichannel parameters;

determining (910), based on the location measure, whether the reconstructed sound source is stable and the location measure is predominantly concentrated in a subset of channels of multichannels of the received multichannel signal;

responsive to the reconstructed sound source being stable and the location measure being predominantly concentrated in a subset of channels of the multichannels and the parameter memory being corrupted, activating (912) parameter recovery to replace decoded multichannel parameters with stored multichannel parameters.

19. The apparatus of Embodiment 18, wherein the coding mode comprises one of an absolute coding mode and a predictive coding mode and wherein determining, based on at least the coding mode and the previous bad frame indicator, whether the parameter memory is corrupted comprises determining, based on the coding mode being the predictive coding mode and the previous bad frame indicator, whether the parameter memory is corrupted.

20. The apparatus of any of Embodiments 18-19 wherein the multichannels comprises two channels and determining (910), based on the location measure, whether the location measure of the reconstructed sound source is predominantly concentrated in the subset of channels of the multichannels comprises determining (910), based on the location measure, whether the location measure of the reconstructed sound source is predominantly concentrated in one of the two channels.

21. The apparatus of any of Embodiments 18-20, wherein deriving the location measure comprises deriving the location measure based on $$\overline{\alpha}(m) = \frac{1}{N_{bands}} \sum_{b=0}^{N_{bands}-1} \hat{\alpha}_b(m)$$

where $\overline{\alpha}(m)$ is the location measure, which comprises a mean of a reconstructed prediction parameter $\hat{\alpha}_b(m)$ over all sub-bands for each frame m and $N_{bands}$ is a number of sub-bands in frame m.

22. The apparatus of Embodiment 21 wherein determining whether the reconstructed sound source is predominantly concentrated in the subset of the channels of the multichannels comprises:

determining a low-pass filtered position in accordance with $$\overline{\alpha}_{LP}(m) = \begin{cases} \gamma\overline{\alpha}(m) + (1-\gamma)\overline{\alpha}_{LP}(m-1), & |\overline{\alpha}(m)| > \overline{\alpha}_{THR} \\ 0, & \text{otherwise} \end{cases}$$

where $\gamma$ is a filter parameter, $\overline{\alpha}(m)$ is a mean of a reconstructed prediction parameter for frame m and $\overline{\alpha}_{LP}(m)$ is the low-pass filtered position;

determining whether an absolute value of the low-pass filtered position is above a threshold $\overline{\alpha}_{THR}$;

responsive to the absolute value of the low-pass filtered position being above the threshold $\overline{\alpha}_{THR}$, determining that the reconstructed sound source is predominantly concentrated in a subset of channels of the multichannels.

23. The apparatus of Embodiment 18, wherein deriving the location measure comprises deriving the location measure based on $$\overline{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m,k)^2$$

$$\tilde{w}_b(m) = \frac{w_b(m) - \min(w_0 \ldots N_{bands}-1(m))}{\max(w_0 \ldots N_{bands}-1(m)) - \min(w_0 \ldots N_{bands}-1(m))}$$

where $\hat{\alpha}(m)$ is the location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m,k)$ is a transformed down-mix signal.

24. An apparatus configured to substitute decoded parameters with estimated parameters in a received multichannel signal, the apparatus comprising:

at least one processor (801);

memory (803) communicatively coupled to the processor, said memory comprising instructions executable by the processor, which when executed cause the processor to perform operations comprising:

determining (1002) whether a coding mode is an absolute coding mode or a predictive coding mode;

responsive to the coding mode being a predictive coding mode:

determining (1006) if a memory corrupted flag is set;

responsive to the memory corrupted flag being set:

determining (1008) whether a reconstructed sound source is a stable sound source and a location measure of the reconstructed sound source is predominantly concentrated in a subset of channels of multichannels of the received multichannel signal;

responsive to the reconstructed sound source being a stable sound source and the location measure of the reconstructed sound source being predominantly concentrated in the subset of the channels, substituting (1010) decoded multichannel parameters with stored multichannel parameters;

responsive to the memory corrupted flag not being set:

analyzing (1012) the location measure of the reconstructed sound source to update the location measure; and updating (1014) the stored multichannel parameters with the decoded multichannel parameters.

25. The apparatus of Embodiment 24, wherein the memory comprises further instructions executable by the processor, which when executed cause the processor to perform operations comprising:

responsive to the coding mode being an absolute coding mode, unsetting (1004) the memory corrupted flag.

26. The apparatus of Embodiment 24, wherein the memory comprises further instructions executable by the processor, which when executed cause the processor to perform operations comprising:

responsive to a bad frame being indicated, setting (1000) the memory corrupted flag.

27. The apparatus of any of Embodiments 24-26 wherein the multichannels comprises two channels and determining whether the location measure of the reconstructed sound source is predominantly concentrated in a subset of channels determining (910) whether the location measure of the reconstructed sound source is predominantly concentrated in one of the two channels.

28. The apparatus of any of Embodiments 24-27 wherein updating the location measure comprises updating the location measure based on $$\bar{\alpha}(m) = \frac{1}{N_{bands}} \sum_{b=0}^{N_{bands}-1} \hat{\alpha}_b(m)$$

where $\bar{\alpha}(m)$ is the location measure, which comprises a mean of a reconstructed prediction parameter $\hat{\alpha}_b(m)$ over all sub-bands for each frame m and $N_{bands}$ is a number of sub-bands in frame m.

29. The apparatus of Embodiment 28 wherein determining whether the location measure of the reconstructed sound source is predominantly concentrated in the subset of channels comprises:

determining a low-pass filtered position based on $$\bar{\alpha}_{LP}(m) = \begin{cases} \gamma\bar{\alpha}(m) + (1-\gamma)\bar{\alpha}_{LP}(m-1), & |\bar{\alpha}(m)| > \bar{\alpha}_{THR} \\ 0, & \text{otherwise} \end{cases}$$

where $\gamma$ is a filter parameter, $\bar{\alpha}(m)$ is a mean of a reconstructed prediction parameter for frame m and $\bar{\alpha}_{LP}(m)$ is the low-pass filtered position;

determining whether an absolute value of the low-pass filtered position is above a threshold $\bar{\alpha}_{THR}$;

responsive to the absolute value of the low-pass filtered position being above the threshold $\bar{\alpha}_{THR}$, determining that the location measure of the reconstructed sound source is predominantly concentrated in a subset of channels.

30. The apparatus of Embodiment 24, wherein deriving the location measure comprises deriving the location measure based on $$\bar{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_M(m, k)^2$$

$$\tilde{w}_b(m) = \frac{w_b(m) - \min(w_0 \dots N_{bands}-1(m))}{\max(w_0 \dots N_{bands}-1(m)) - \min(w_0 \dots N_{bands}-1(m))}$$

where $\bar{\alpha}(m)$ is the location measure, which comprises a weighted mean of a reconstructed prediction parameter $\hat{\alpha}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_M(m, k)$ is a transformed down-mix signal.

Explanations for abbreviations from the above disclosure are provided below.

ABBREVIATION EXPLANATION

BFI Bad Frame Indicator
PREY BFI Previous frame Bad Frame Indicator
DFT Discrete Fourier Transform
LP Linear Prediction
PLC Packet Loss Concealment
ECU Error Concealment Unit
FEC Frame Error Correction/Concealment
MDCT Modified Discrete Cosine Transform
MDST Modified Discrete Sine Transform
MSE Mean Squared Error
ODFT Odd Discrete Fourier Transform
LTP Long Term Predictor
ITD Inter-channel Time Difference
IPD Inter-channel Phase Difference
ILD Inter-channel Level Difference
ICC Inter-channel Coherence
FD Frequency Domain
TD Time Domain
FLC Frame Loss Concealment Citations for references from the above disclosure are provided below.

[1]. C. Faller, "Parametric multichannel audio coding: synthesis of coherence cues," in IEEE Transactions on Audio, Speech, and Language Processing, vol. 14, no. 1, pp. 299-310, January 2006.

[2]. Breebaart, J., Herre, J., Faller, C., Rödén, J., Myburg, F., Disch, S., . . . & Oomen, W. (2005). "MPEG spatial audio coding/MPEG surround: Overview and current status," 2005 In Preprint 119th Cony. Aud. Eng. Soc. (No. LCAV-CONF-2005-029).

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method of replacing decoded parameters in a received multichannel signal, the method comprising:
   determining whether a bad frame is indicated for a current frame of the multichannel signal;
   responsive to the bad frame being indicated, determining that a parameter memory is corrupted and performing packet loss concealment operations for the current frame;
   responsive to the bad frame not being indicated, decoding multichannel parameters of the current frame of a received multichannel signal, and:
      responsive to the parameter memory not being corrupted, deriving a location measure of a reconstructed sound source based on decoded multichannel parameters, wherein deriving the location measure is based on a mean of a reconstructed side signal prediction parameter over all sub-bands for the current frame;
      responsive to the parameter memory being corrupted, determining, based on the location measure, whether the reconstructed sound source is stable and predominantly concentrated in a subset of channels of multichannels of the received multichannel signal; and
      responsive to the reconstructed sound source being concentrated in the subset of channels of the multichannels and being stable, activating parameter recovery to replace decoded multichannel parameters with stored multichannel parameters.

2. The method of claim 1, further in response to the bad frame not being indicated, storing the decoded multichannel parameters as the stored multichannel parameters.

3. The method of claim 1 wherein the multichannels comprises two channels and determining, based on the location measure, whether the location measure of the reconstructed sound source is predominantly concentrated in the subset of channels of the multichannels comprises determining, based on the location measure, whether the location measure of the reconstructed sound source is predominantly concentrated in one of the two channels.

4. The method of claim 1, wherein a coding mode comprises one of an absolute coding mode and a predictive coding mode and responsive to the coding mode being the absolute coding mode, unsetting a memory corrupted flag responsive to the memory corrupted flag being set.

5. The method of claim 1, wherein deriving the location measure comprises deriving the location measure based on $$\overline{\alpha}(m) = \frac{1}{N_{bands}} \sum_{b=0}^{N_{bands}-1} \hat{\alpha}_b(m)$$

where $\overline{\alpha}(m)$ is the location measure, which comprises a mean of a reconstructed prediction parameter $\hat{\alpha}_b(m)$ over all sub-bands for each frame m and $N_{bands}$ is a number of sub-bands in frame m.

6. The method of claim 5 wherein determining whether the location measure of the reconstructed sound source is predominantly concentrated in a subset of channels of the multichannels comprises:
   determining a low-pass filtered position based on $$\overline{\alpha}_{LP}(m) = \begin{cases} \gamma\overline{\alpha}(m) + (1-\gamma)\overline{\alpha}_{LP}(m-1), & |\overline{\alpha}(m)| > \overline{\alpha}_{THR} \\ 0, & \text{otherwise} \end{cases}$$

where $\gamma$ is a filter parameter, $\overline{\alpha}(m)$ is a mean of a reconstructed prediction parameter for frame m and $\overline{\alpha}_{LP}(m)$ is the low-pass filtered position;
   determining whether an absolute value of the low-pass filtered position is above a threshold $\overline{\alpha}_{THR}$; and
   responsive to the absolute value of the low-pass filtered position being above the threshold $\overline{\alpha}_{THR}$, determining that the location measure of the sound source is predominantly concentrated in a subset of channels of the multichannels.

7. The method of claim 1, wherein deriving the location measure comprises deriving the location measure based on $$\overline{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m,k)^2$$

$$\tilde{w}_b(m) = \frac{w_b(m) - \min(w_0 \dots N_{bands}-1(m))}{\max(w_0 \dots N_{bands}-1(m)) - \min(w_0 \dots N_{bands}-1(m))}$$

where $\overline{\alpha}(m)$ is the location measure, which comprises a weighted mean of a reconstructed prediction parameter $\hat{a}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m,k)$ is a transformed down-mix signal.

8. A decoder for a communication network, the decoder comprising:
   a processor; and
   memory coupled with the processor, wherein the memory comprises instructions that when executed by the processor causes the processor to perform operations comprising:
      determining whether a bad frame is indicated for a current frame of a multichannel signal;
      responsive to the bad frame being indicated, determining that a parameter memory is corrupted and performing packet loss concealment operations for the current frame;
      responsive to the bad frame not being indicated, decoding multichannel parameters of the current frame of a received multichannel signal, and:

responsive to the parameter memory not being corrupted, deriving a location measure of a reconstructed sound source based on decoded multichannel parameters, wherein deriving the location measure is based on a mean of a reconstructed side signal prediction parameter over all sub-bands for the current frame;

responsive to the parameter memory being corrupted, determining, based on the location measure, whether the reconstructed sound source is stable and predominantly concentrated in a subset of channels of multichannels of the received multichannel signal; and responsive to the reconstructed sound source being concentrated in the subset of channels of the multichannels and being stable, activating parameter recovery to replace decoded multichannel parameters with stored multichannel parameters.

9. The decoder of claim 8 wherein the multichannels comprises two channels and determining, based on the location measure, whether the location measure of the reconstructed sound source is predominantly concentrated in the subset of channels of the multichannels comprises determining, based on the location measure, whether the location measure of the reconstructed sound source is predominantly concentrated in one of the two channels.

10. The decoder of claim 8, wherein the coding mode comprises one of an absolute coding mode and a predictive coding mode and responsive to the coding mode being the absolute coding mode, unsetting a memory corrupted flag responsive to the memory corrupted flag being set.

11. The decoder of claim 8, wherein deriving the location measure comprises deriving the location measure based on $$\overline{\alpha}(m) = \frac{1}{N_{bands}} \sum_{b=0}^{N_{bands}-1} \hat{\alpha}_b(m)$$

where $\overline{\alpha}(m)$ is the location measure, which comprises a mean of a reconstructed prediction parameter $\hat{a}_b(m)$ over all sub-bands for each frame m and $N_{bands}$ is a number of sub-bands in frame m.

12. The decoder of claim 11 wherein determining whether the location measure of the reconstructed sound source is predominantly concentrated in a subset of channels of the multichannels comprises:

determining a low-pass filtered position based on $$\overline{\alpha}_{LP}(m) = \begin{cases} \gamma\overline{\alpha}(m) + (1-\gamma)\overline{\alpha}_{LP}(m-1), & |\overline{\alpha}(m)| > \overline{\alpha}_{THR} \\ 0, & \text{otherwise} \end{cases}$$

where $\gamma$ is a filter parameter, $\overline{\alpha}(m)$ is a mean of a reconstructed prediction parameter for frame m and $\overline{\alpha}_{LP}(m)$ is the low-pass filtered position;

determining whether an absolute value of the low-pass filtered position is above a threshold $\overline{\alpha}_{THR}$; and responsive to the absolute value of the low-pass filtered position being above the threshold $\overline{\alpha}_{THR}$, determining that the location measure of the sound source is predominantly concentrated in a subset of channels of the multichannels.

13. The decoder of claim 12, wherein deriving the location measure comprises deriving the location measure based on $$\overline{\alpha}_w(m) = \frac{1}{N_{bands}} \sum_{b=0}^{N_{bands}-1} \hat{\alpha}_b(m) \cdot \tilde{w}_b(m)$$

$$w_b(m) = \frac{1}{k_{end(b)} - k_{start(b)} + 1} \sum_{k=k_{start(b)}}^{k_{end(b)}} X_{\hat{M}}(m,k)^2$$

$$\tilde{w}_b(m) = \frac{w_b(m) - \min(w_0 \ldots _{N_{bands}-1}(m))}{\max(w_0 \ldots _{N_{bands}-1}(m)) - \min(w_0 \ldots _{N_{bands}-1}(m))}$$

where $\overline{\alpha}(m)$ is the location measure, which comprises a weighted mean of a reconstructed prediction parameter $\hat{a}_b(m)$ over all sub-bands for each frame m and $N_{bands}$ is a number of sub-bands in frame m, $w_b(m)$ and $\tilde{w}_b(m)$ are weighting coefficients, $k_{end(b)}$ is an end of a number of sums, $k_{start(b)}$ is a start of the number of sums and $X_{\hat{M}}(m,k)$ is a transformed down-mix signal.

14. A computer program product comprising a non-transitory computer-readable storage medium, the non-transitory computer-readable storage medium having computer-executable instructions that when executed on a processor comprised in device cause the device to perform operations comprising:

determining whether a bad frame is indicated for a current frame of a multichannel signal;

responsive to the bad frame being indicated, determining that a parameter memory is corrupted and performing packet loss concealment operations for the current frame;

responsive to the bad frame not being indicated, decoding multichannel parameters of the current frame of a received multichannel signal, and:

responsive to the parameter memory not being corrupted, deriving a location measure of a reconstructed sound source based on decoded multichannel parameters, wherein deriving the location measure is based on a mean of a reconstructed side signal prediction parameter over all sub-bands for the current frame;

responsive to the parameter memory being corrupted, determining, based on the location measure, whether the reconstructed sound source is stable and predominantly concentrated in a subset of channels of multichannels of the received multichannel signal; and responsive to the reconstructed sound source being concentrated in the subset of channels of the multichannels and being stable, activating parameter recovery to replace decoded multichannel parameters with stored multichannel parameters.

* * * * *